United States Patent
Nagatomi et al.

(10) Patent No.: US 8,121,013 B2
(45) Date of Patent: Feb. 21, 2012

(54) OPTICAL PICKUP APPARATUS AND OPTICAL DISC APPARATUS

(75) Inventors: Kenji Nagatomi, Kaizu (JP); Yoichi Tsuchiya, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 158 days.

(21) Appl. No.: 12/567,299

(22) Filed: Sep. 25, 2009

(65) Prior Publication Data

US 2010/0080106 A1      Apr. 1, 2010

(30) Foreign Application Priority Data

Sep. 29, 2008    (JP) ................................ 2008-251588
May 28, 2009    (JP) ................................ 2009-129668

(51) Int. Cl.
*G11B 7/135*      (2006.01)

(52) U.S. Cl. ......... 369/112.26; 369/112.03; 369/112.12; 369/112.19; 369/112.23; 369/44.23; 369/44.32; 369/44.42; 369/47.14; 369/47.17; 369/120

(58) Field of Classification Search ........................ None
See application file for complete search history.

(56) References Cited

U.S. PATENT DOCUMENTS

| | | | |
|---|---|---|---|
| 7,916,612 B2 * | 3/2011 | Nagatomi et al. ....... | 369/112.19 |
| 2002/0048233 A1 | 4/2002 | Ogasawara et al. | |
| 2007/0109946 A1 | 5/2007 | Hiraga et al. | |
| 2008/0165655 A1 | 7/2008 | Saitoh et al. | |
| 2009/0225645 A1 * | 9/2009 | Nagatomi ................ | 369/112.23 |
| 2010/0027386 A1 * | 2/2010 | Nagatomi et al. ......... | 369/44.32 |
| 2010/0027404 A1 * | 2/2010 | Nagatomi et al. ....... | 369/112.23 |
| 2010/0027405 A1 * | 2/2010 | Nagatomi et al. ....... | 369/112.23 |

FOREIGN PATENT DOCUMENTS

| | | |
|---|---|---|
| JP | 11-353666 A | 12/1999 |
| JP | 2002-92905 A | 3/2002 |
| JP | 2006-252716 A | 9/2006 |
| JP | 2006-260669 A | 9/2006 |
| JP | 2007-164957 A | 6/2007 |
| JP | 2008-102998 A | 5/2008 |
| JP | 2008-171470 A | 7/2008 |
| JP | 2009-3986 A | 1/2009 |

(Continued)

OTHER PUBLICATIONS

Explanation of Circumstances filed in the corresponding Japanese Application No. 2009-129668, filed Jun. 3, 2010, pp. 1-15, Japan.

(Continued)

*Primary Examiner* — Joseph Haley
*Assistant Examiner* — Ifedayo Iluyomade
(74) *Attorney, Agent, or Firm* — Dittavong Mori & Steiner, P.C.

(57) ABSTRACT

An optical pickup apparatus changes a propagation direction of luminous fluxes, out of a laser light reflected by a disc, in four luminous flux regions set about a laser optical axis so as to mutually disperse these luminous fluxes. A signal light region in which only a signal light is present appears on a detection surface of a photodetector. A plurality of sensors for a signal light are placed at positions irradiated with the signal light within the region. When an arithmetic process is performed on a detection signal outputted from each sensor, a DC component occurring in a tracking error signal is suppressed.

9 Claims, 21 Drawing Sheets

FOREIGN PATENT DOCUMENTS

| | | |
|---|---|---|
| JP | 2009-9630 A | 1/2009 |
| JP | 2009-157978 A | 7/2009 |
| JP | 2009-170060 A | 7/2009 |
| WO | WO2004/040562 A1 | 5/2004 |
| WO | WO2007/105704 A1 | 9/2007 |
| WO | WO2008/007768 A1 | 1/2008 |
| WO | WO2008/053548 A1 | 5/2008 |

OTHER PUBLICATIONS

Japanese Office Action for corresponding JP Application No. 2009-129668, dated Jul. 6, 2010, pp. 1-5 Japan.

* cited by examiner

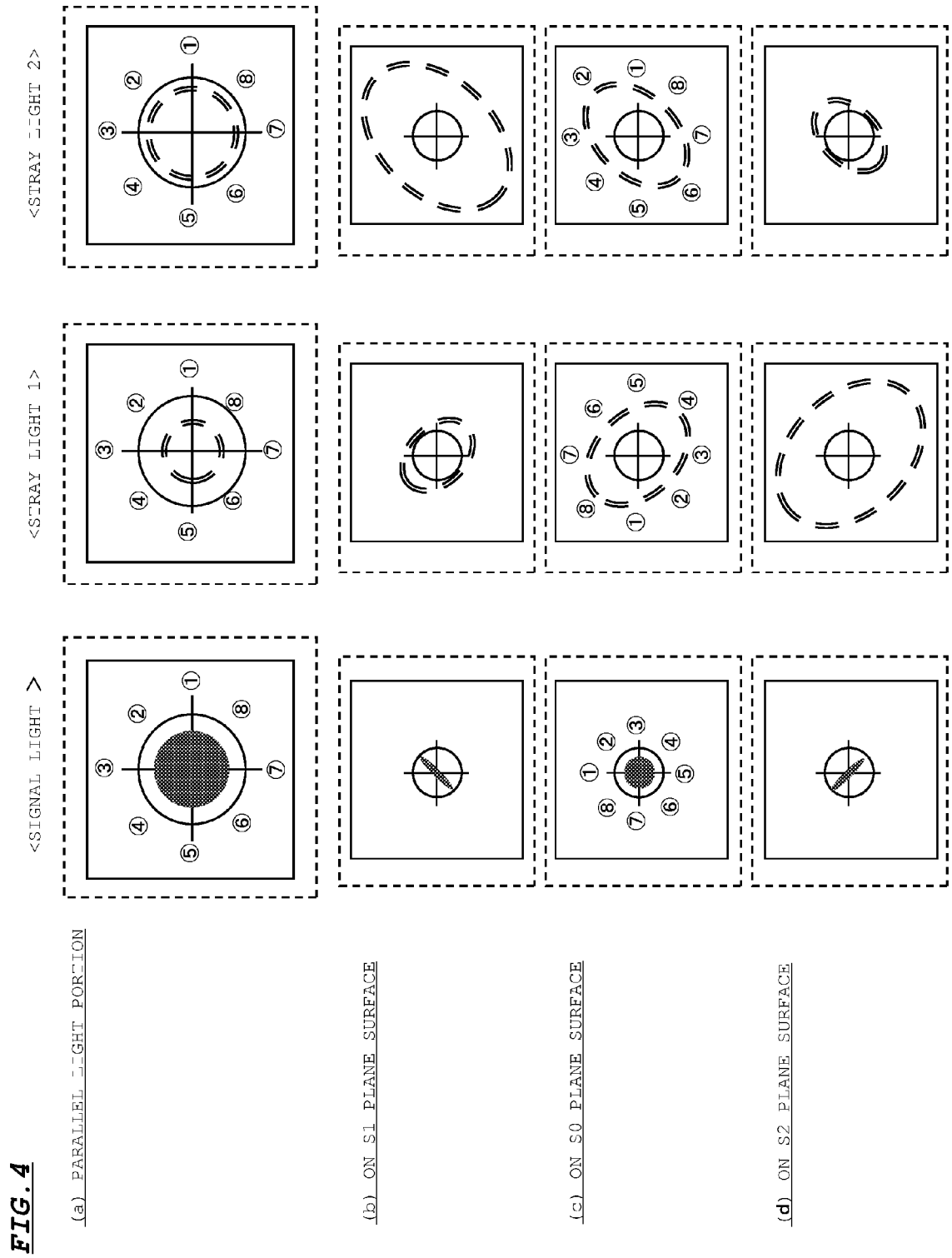

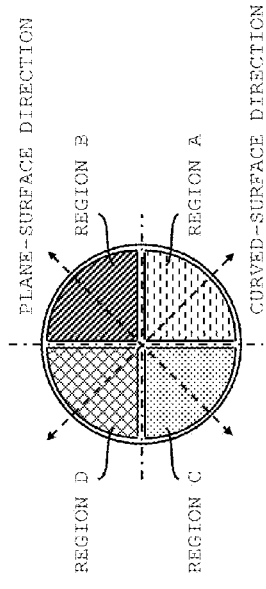
FIG. 5A  LUMINOUS FLUX SPLITTING PATTERN
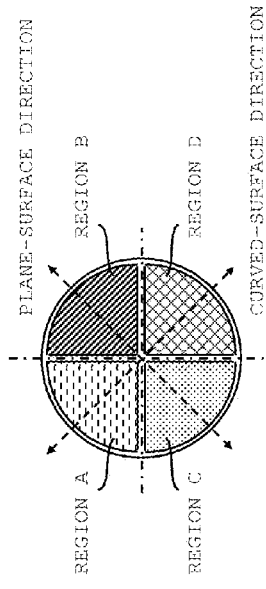
FIG. 5B  SIGNAL LIGHT
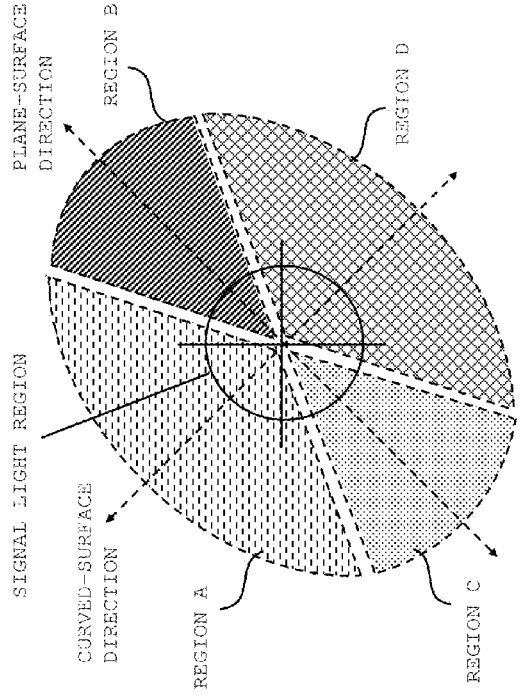
FIG. 5C  STRAY LIGHT 1
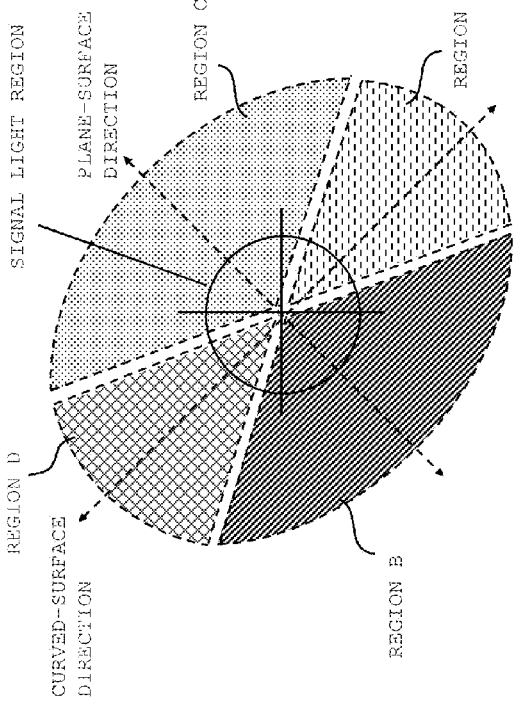
FIG. 5D  STRAY LIGHT 2

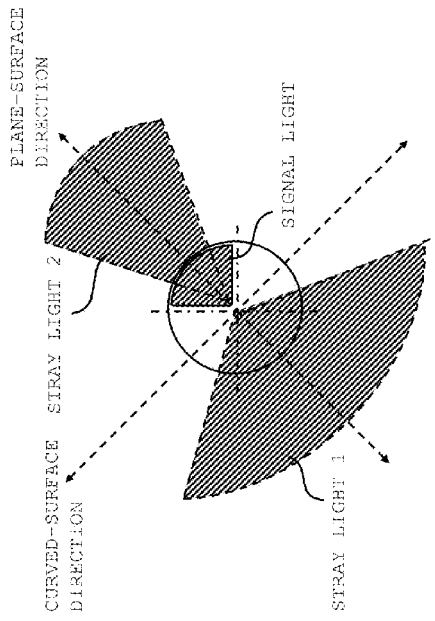
FIG. 6A LUMINOUS FLUX STATE OF REGION A
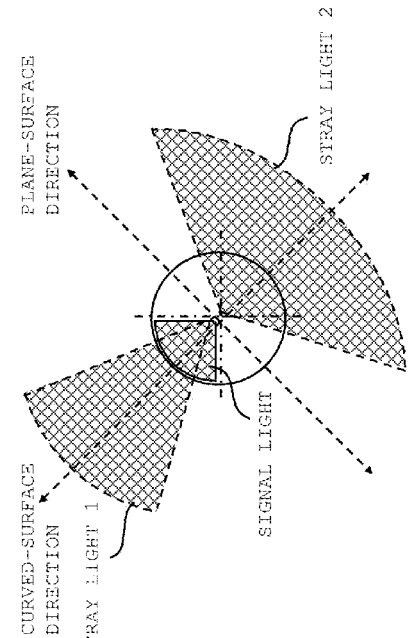
FIG. 6B LUMINOUS FLUX STATE OF REGION B
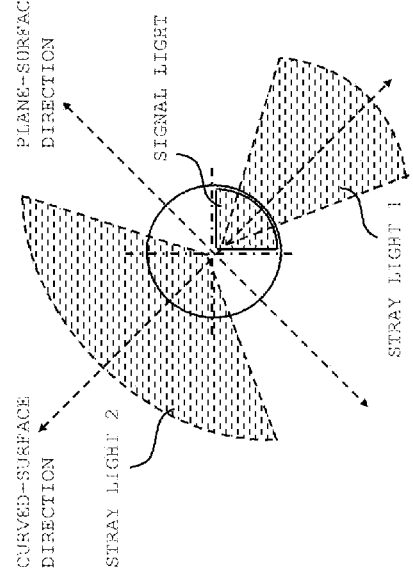
FIG. 6C LUMINOUS FLUX STATE OF REGION C
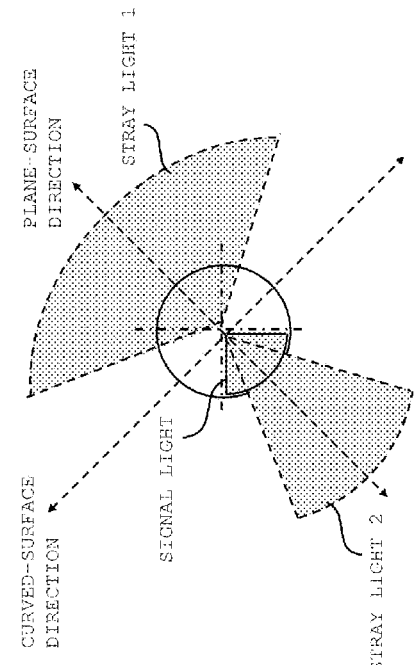
FIG. 6D LUMINOUS FLUX STATE OF REGION D

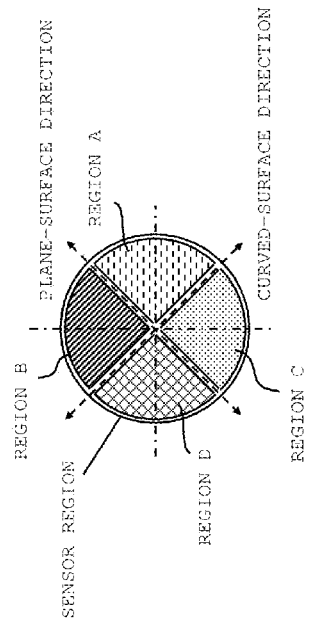
FIG. 7A LUMINOUS FLUX SPLITTING PATTERN
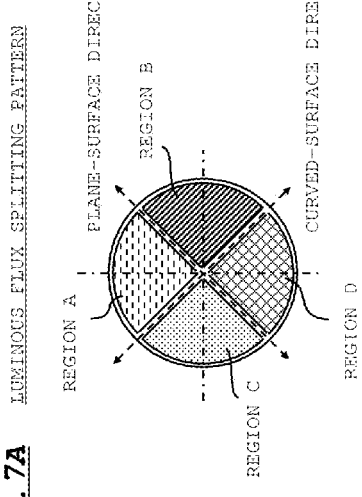
FIG. 7B SIGNAL LIGHT
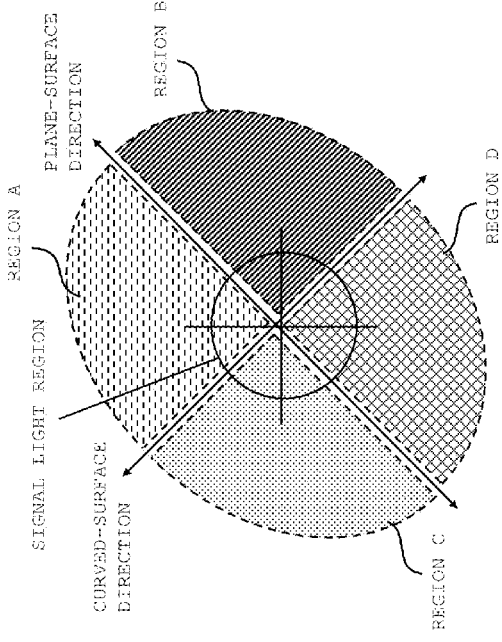
FIG. 7C STRAY LIGHT 1
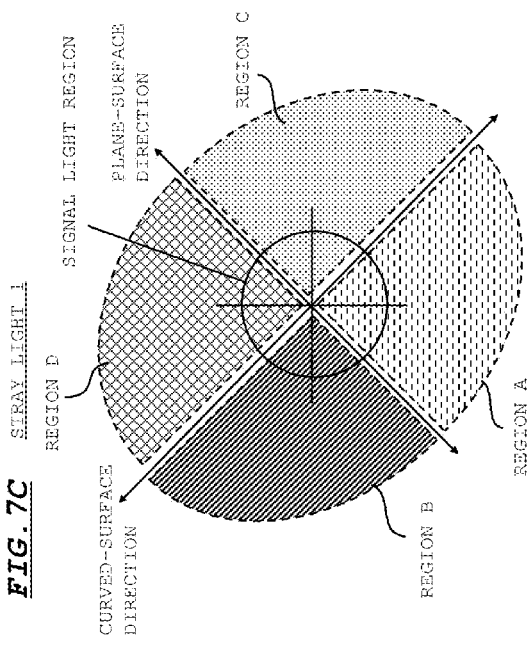
FIG. 7D STRAY LIGHT 2

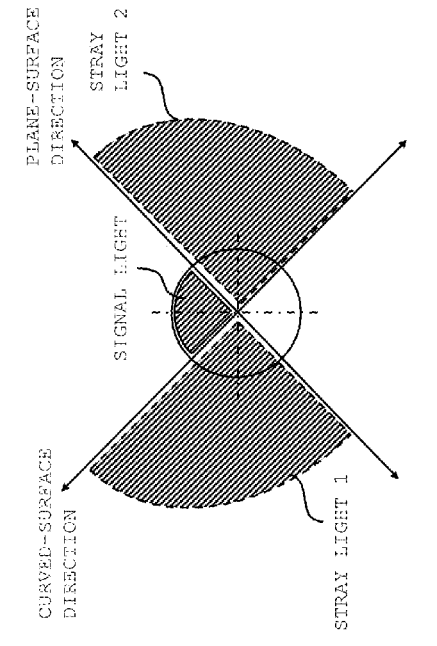
FIG. 8A LUMINOUS FLUX STATE OF REGION A
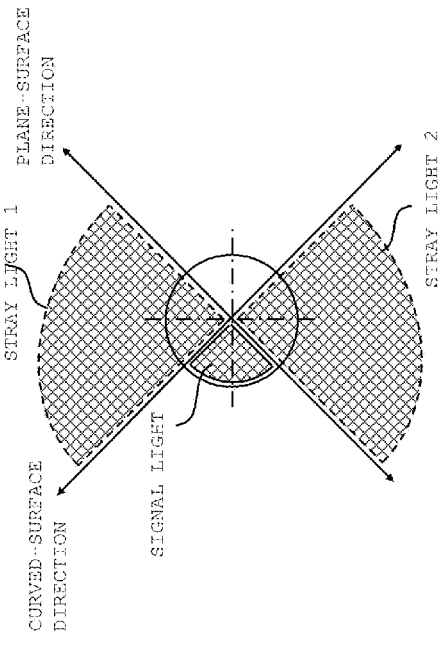
FIG. 8B LUMINOUS FLUX STATE OF REGION B
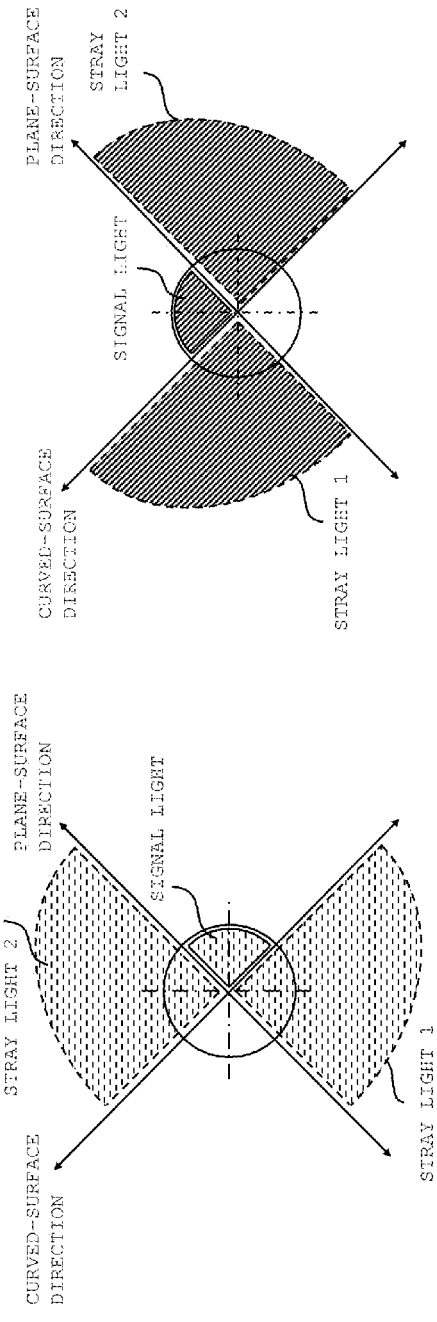
FIG. 8C LUMINOUS FLUX STATE OF REGION C
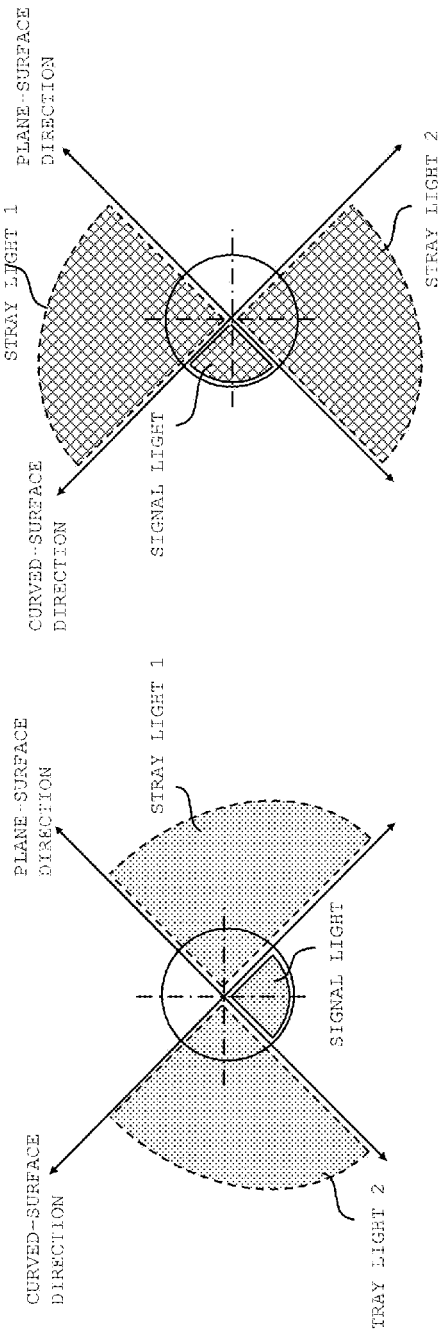
FIG. 8D LUMINOUS FLUX STATE OF REGION D

ANGULAR PROVISION TO EACH REGION

LUMINOUS FLUX ON S0 PLANE SURFACE

FE = (A+B+E+F) - (C+D+G+H)
PP = (A+B+G+H) - (C+D+E+F)

FE = (A+B+E+F) - (C+D+G+H)
PP = (A+B+G+H) - (C+D+E+F)

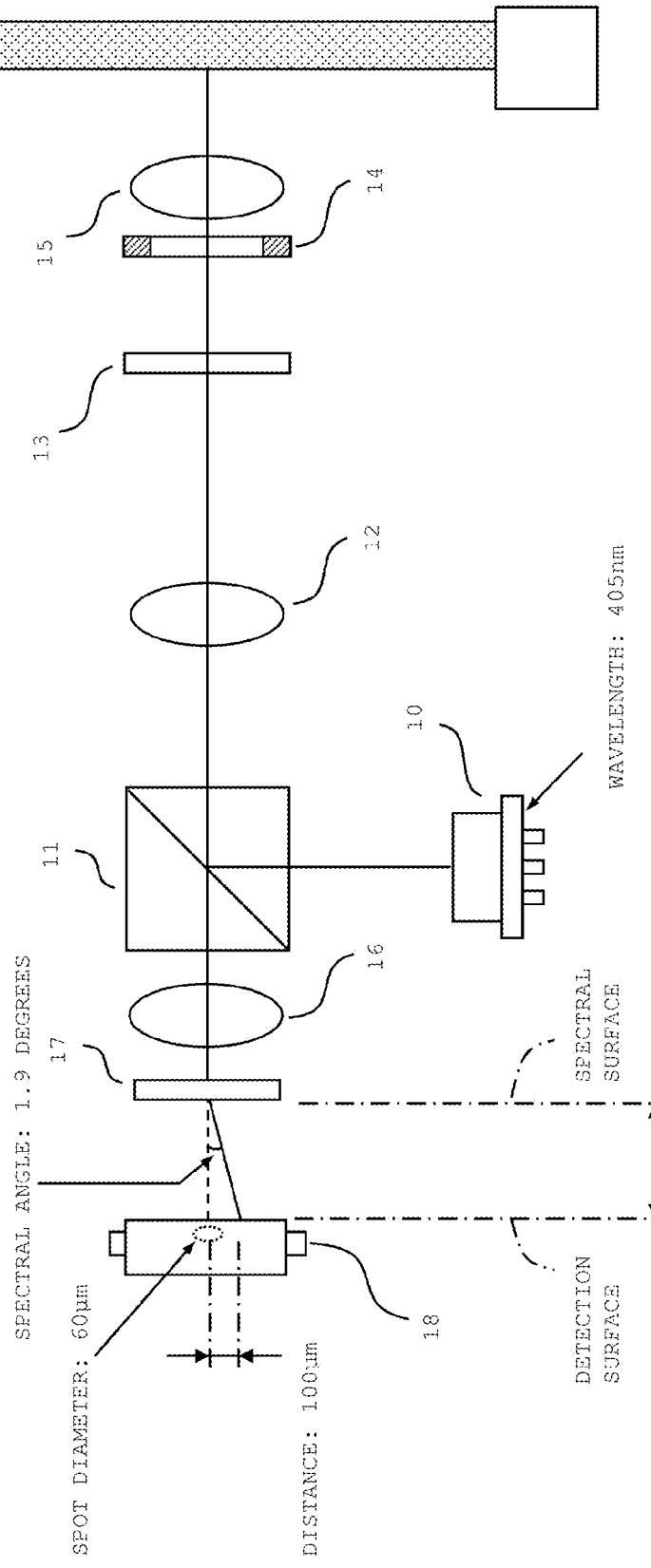

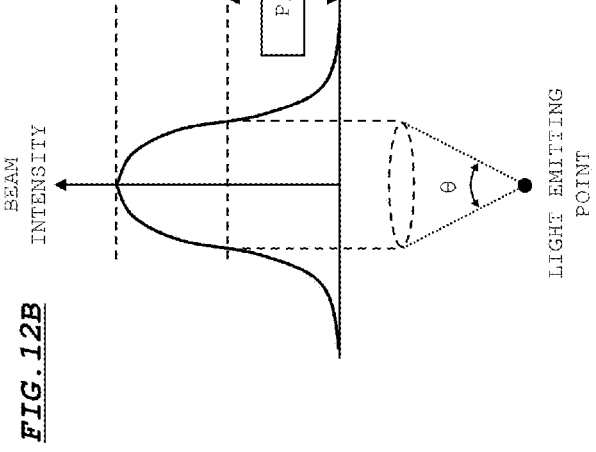
FIG.12A
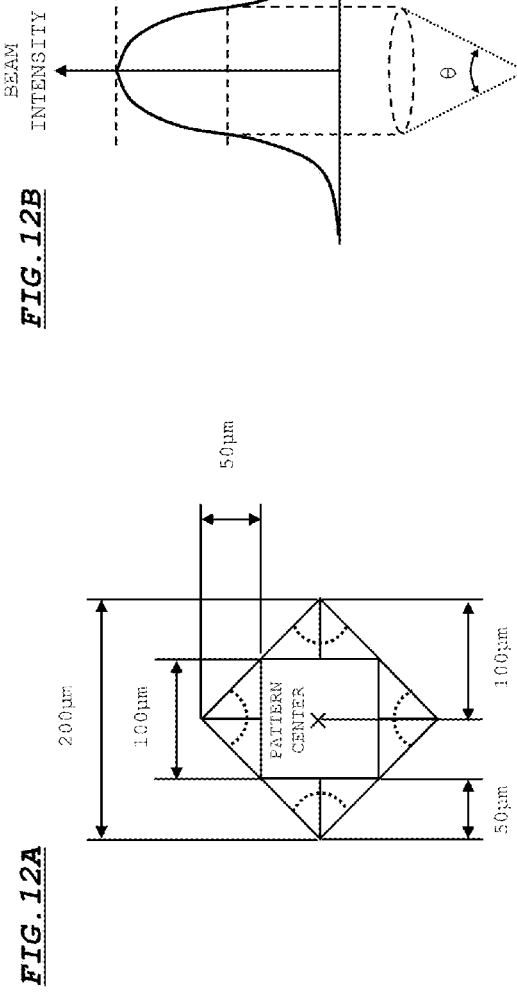
FIG.12B
FIG.12C
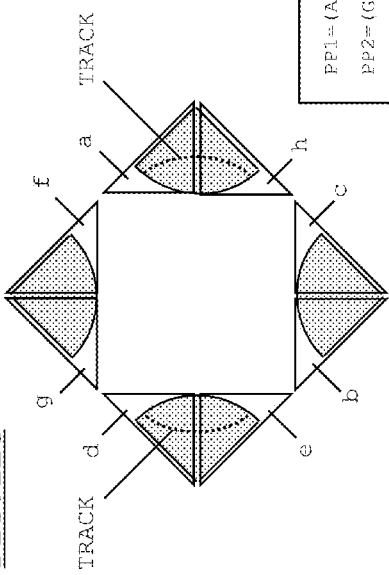
FIG.12D

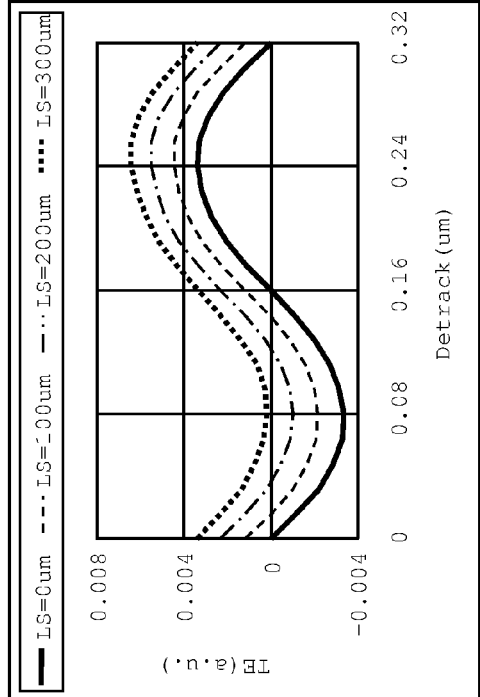
*FIG.15B*
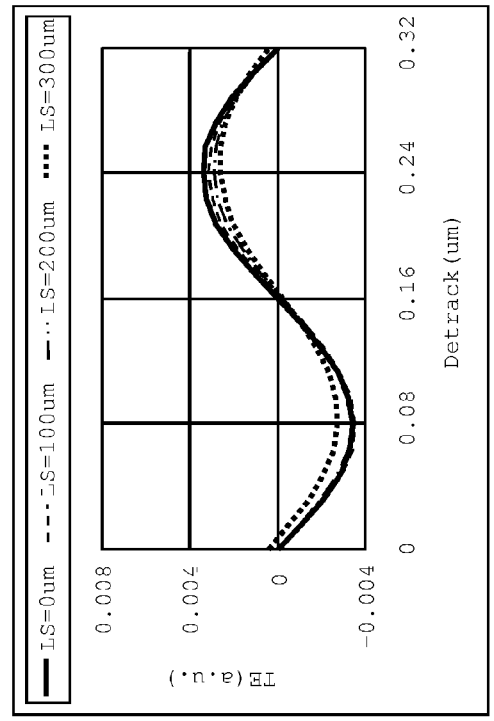
*FIG.15C*
k=3
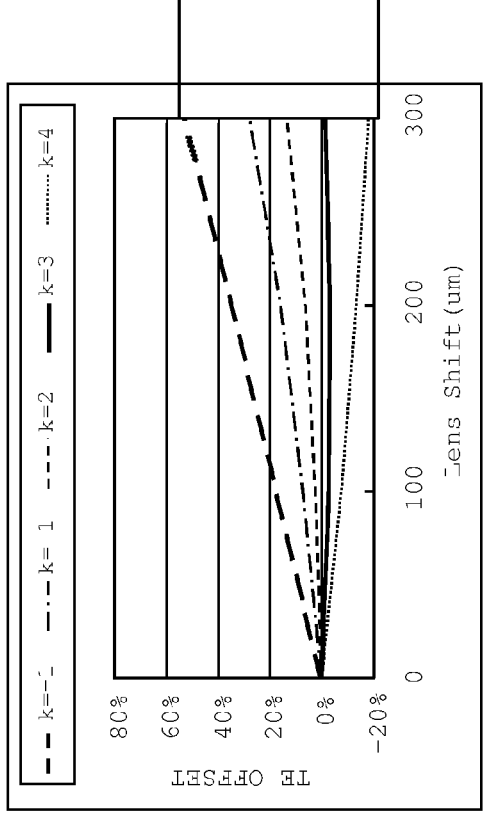
*FIG.15A*

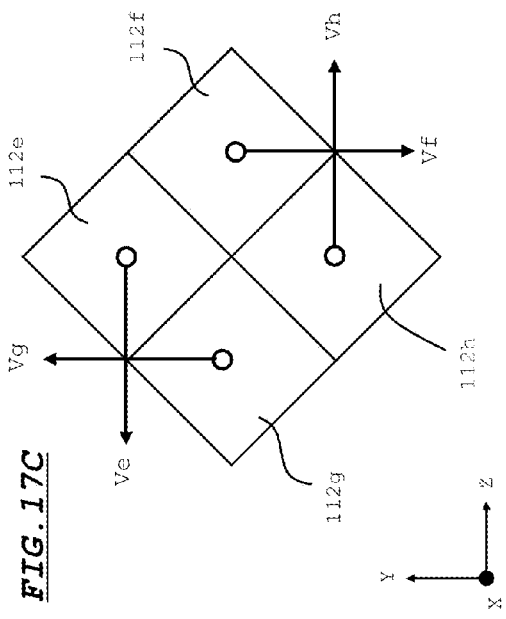
FIG. 17B
FIG. 17C
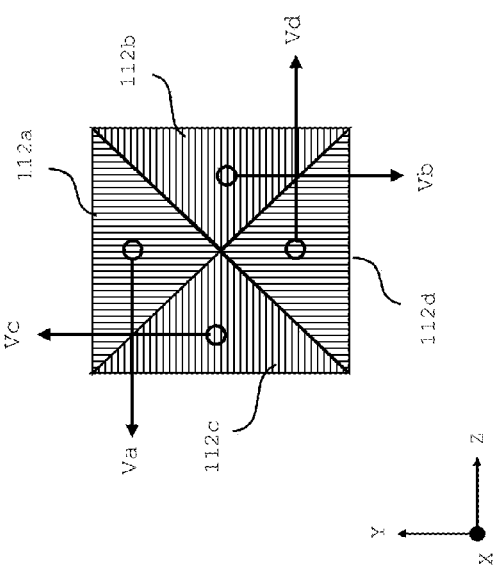
FIG. 17A

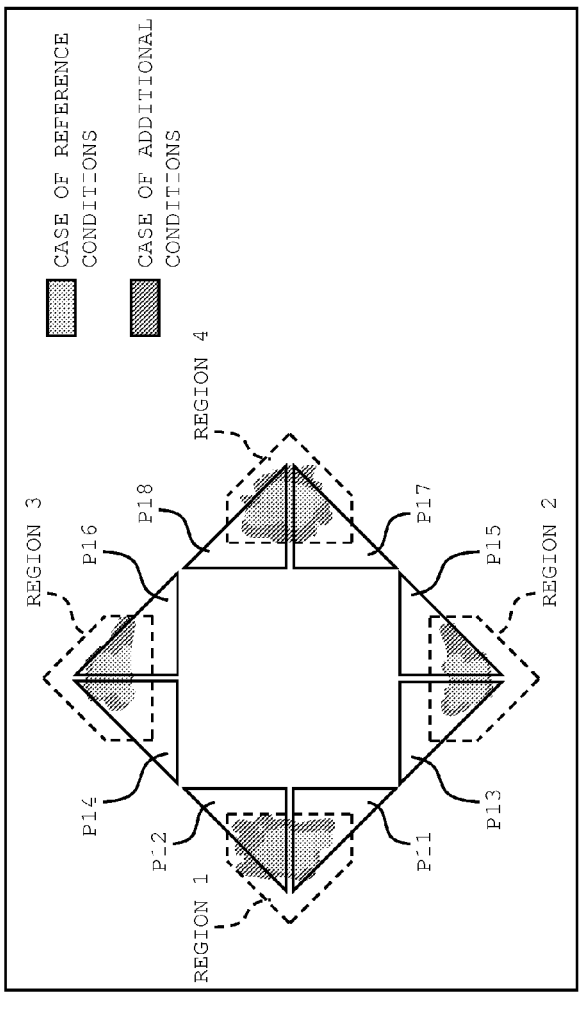
FIG. 20A
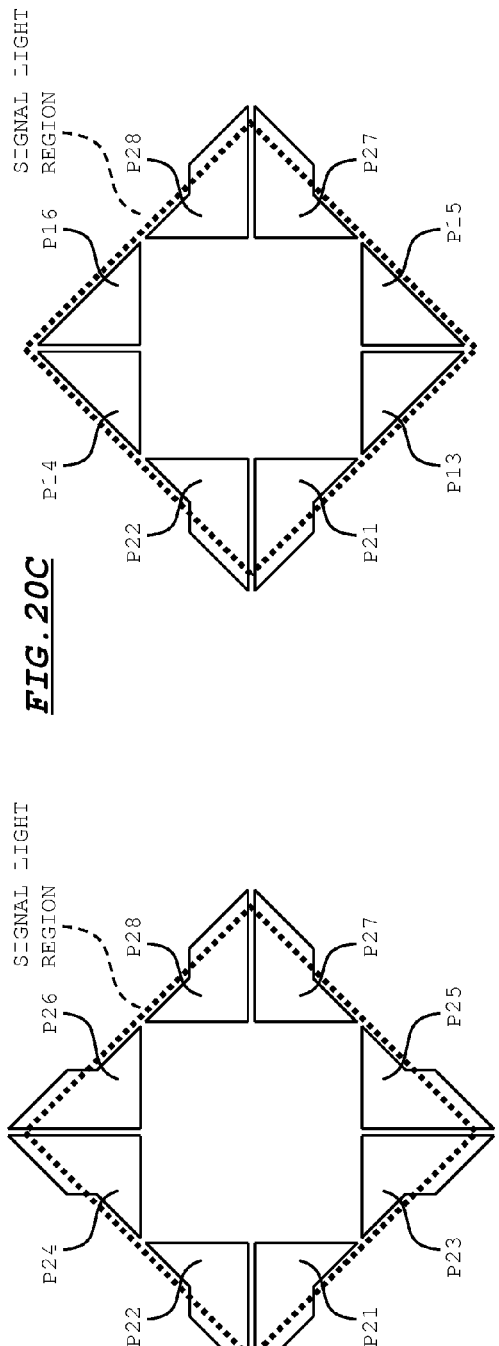
FIG. 20B
FIG. 20C

PP1= (A+B) − (E+F)
PP2= (G+D) − (H+C)

TRACK DIRECTION

PP1= (A+H) − (D+E)
PP2= (F+C) − (G+B)

TRACK DIRECTION

TRACK DIRECTION

US 8,121,013 B2

OPTICAL PICKUP APPARATUS AND OPTICAL DISC APPARATUS

This application claims priority under 35 U.S.C. Section 119 of Japanese Patent Application No. 2008-251588 filed Sep. 29, 2008, entitled "OPTICAL PICKUP APPARATUS AND OPTICAL DISC APPARATUS" and Japanese Patent Application No. 2009-129668 filed May 28, 2009, entitled "OPTICAL PICKUP APPARATUS AND OPTICAL DISC APPARATUS". The disclosures of the above applications are incorporated herein by reference.

BACKGROUND OF THE INVENTION

1. Field of the Invention

The present invention relates to an optical pickup apparatus, and an optical disc apparatus, and more particularly, relates to an optical pickup apparatus, and an optical disc apparatus suitable in use at the time of recording to and reproducing from a recording medium stacked thereon with a plurality of recording layers.

2. Description of the Related Art

In the recent years, along with the increased capacity of optical discs, the multilayered recording layers have been advanced. By including a plurality of recording layers in a single disc, the data capacity of the disc can be increased remarkably. When stacking the recording layers, the general practice until now has been to stack two layers on one side, but recently, to further advance the large capacity, disposing three or more recording layers on one side is also examined. Herein, when the number of recording layers to be stacked is increased, the large capacity of a disc can be promoted. However, on the other hand, the space between recording layers is narrowed, and signal degradation caused by crosstalk between layers increases.

If the recording layer is multilayered, a reflected light from the recording layer to be recorded or reproduced (target recording layer) becomes very weak. Therefore, when unnecessary reflected light (stray light) enters a photodetector from the recording layers present above and below the target recording layer, the detection signal is degraded, which may exert an adverse effect on a focus servo and a tracking servo. Therefore, when a large number of recording layers are disposed in this way, the stray light needs to be removed properly so as to stabilize the signals from the photodetector.

Herein, a method for removing the stray light includes that which uses a pinhole. In this method, a pinhole is disposed at a convergence position of the signal light. According to this method, a part of the stray light is intercepted by the pinhole, and therefore, the unnecessary stray light component entering the photodetector can be reduced. Another method for removing the stray light includes that which combines ½ wavelength plates and polarized light optical elements. According to this method, a polarization direction of the stray light is changed by the ½ wavelength plates, and the stray light is intercepted by the polarized light optical elements. Thus, the unnecessary stray light component entering the photodetector can be removed.

However, in the case of the method for removing the stray light by using a pinhole, the pinhole needs to be positioned accurately at the convergence position of a laser light (signal light) reflected from the target recording layer, and therefore, a task for adjusting the position of the pinhole is difficult, thus posing a problem. If the size of the pinhole is increased to facilitate the task for adjusting the position, the proportion of the stray light passing through the pinhole increases, and the signal degradation caused by the stray light cannot be inhibited effectively.

Furthermore, in the case of the method in which the ½ wavelength plates and the polarized light optical elements are combined to remove the stray light, apart from the fact that the ½ wavelength plates and the polarized light optical elements two each are needed to remove the stray light, a user needs to have two lenses, which increases the number of components and the cost, and adjusting the placement of each component is a complex process, thus posing a problem. Furthermore, the user needs to have a space for placing and arraying these components, which results in the enlargement of the optical system, thus posing a problem.

In the optical disc apparatus, a tracking error signal is produced based on the bias of a light amount distribution of a laser light reflected by the disc. A DC component is superimposed on the tracking error signal depending on the offset of the objective lens with respect to the laser optical axis. Thus, the optical disc apparatus requires a technique of smoothly suppressing the DC component.

It is possible to suppress such a DC component by a DPP (Differential Push-Pull) method using three beams, for example. However, the method using three beams has a problem in that it is necessary to divide the laser light into three beams, and as a result, the configuration of an optical system and a photodetector becomes complicated.

SUMMARY OF THE INVENTION

An optical pickup apparatus according to a first aspect of the present invention is provided with: a laser light source; an objective lens for converging a laser light emitted from the laser light source onto a recording medium; and an astigmatic element for introducing an astigmatism into the laser light reflected by the recording medium. The astigmatic element mutually spaces a first focal line position occurring by convergence of the laser light in a first direction and a second focal line position occurring by convergence of the laser light in a second direction vertical to the first direction, into a propagation direction of the laser light. Moreover, the optical pickup apparatus is provided with a photodetector having eight sensors for individually receiving eight luminous fluxes, the eight luminous being obtained by dividing a luminous flux of the laser light reflected by the recording medium into eight portions by first and second straight lines respectively parallel to the first and second directions and third and fourth straight lines each having an angle of 45 degrees relative to the first and second straight lines. In this case, the astigmatic element is placed so that a track image from the recording medium is parallel to any of the first, second, third, and fourth straight lines.

An optical disc apparatus according to a second aspect of the present invention is provided with the optical pickup apparatus according to the first aspect.

When the optical pickup apparatus according to the first aspect or the optical disc apparatus according to the second aspect is disposed with an arithmetic circuit having a configuration below, a DC component occurring in a tracking error signal may be suppressed.

That is, the arithmetic circuit processes an output signal from the photodetector. Herein, it is assumed that the luminous flux of the laser light reflected from the recording medium is divided into fifth, sixth, seventh and eighth luminous fluxes by the two straight lines, out of the first, second, third, and fourth straight lines, having an angle of 45 degrees with respect to the track image, the fifth and sixth luminous fluxes are aligned in a direction transverse the track image, and the seventh and eighth luminous fluxes are aligned in a direction parallel to the track image. Then, the arithmetic circuit is configured to include a first arithmetic unit for calculating a light amount difference between the fifth and sixth luminous fluxes based on output signals from the sensors corresponding to the fifth and sixth luminous fluxes, and a second arithmetic unit for calculating a bias of the light amount of the seventh and eighth luminous fluxes in the direction transverse the track image based on output signals from the sensors corresponding to the seventh and eighth luminous fluxes. Moreover, the arithmetic circuit is further provided with a third arithmetic unit for subtracting a value obtained by multiplying a variable k by an arithmetic value by the second arithmetic unit, from an arithmetic value by the first arithmetic unit. When a value of the variable k is adjusted, it becomes possible to suppress the DC component occurring in the tracking error signal.

BRIEF DESCRIPTION OF THE DRAWINGS

The above and other objects and novel features of the present invention will become more completely apparent from the description of the embodiment below taken with the following accompanying drawings.

FIG. 4 is a diagram describing the technical principle (a manner in which a light ray advances) according to the embodiment.

FIGS. 5A to 5D are diagrams each describing the technical principle (a splitting pattern and a distribution of a luminous flux) according to the embodiment.

FIGS. 6A to 6D are diagrams each describing the technical principle (a splitting pattern and a distribution of a luminous flux) according to the embodiment.

FIGS. 7A to 7D are diagrams each describing the technical principle (a splitting pattern and a distribution of a luminous flux) according to the embodiment.

FIGS. 8A to 8D are diagrams each describing the technical principle (a splitting pattern and a distribution of a luminous flux) according to the embodiment.

FIG. 11 is a diagram showing an optical system used for verifying (simulating) a DC component of a push-pull signal.

FIG. 12A to FIG. 12D are diagrams each describing a condition for the simulation above.

FIG. 15A to FIG. 15C are graphs each showing simulation results when verifying an offset state of the push-pull signal when a variable k is changed.

FIG. 17A to FIG. 17C are diagrams each showing a configuration example of an angle adjusting element according to the embodiment.

FIG. 20A to FIG. 20C are diagrams each showing a configuration example of a sensor pattern according to a modified example.

However, the diagrams are for the purposes of illustration only, and are not intended to limit the scope of the present invention.

DESCRIPTION OF THE PREFERRED EMBODIMENTS

An embodiment of the present invention will be described below with reference to the drawings.

Technical Principle

Firstly, with reference to FIG. 1A to FIG. 10D, a technical principle applied to this embodiment will be described.

Figure 1B:
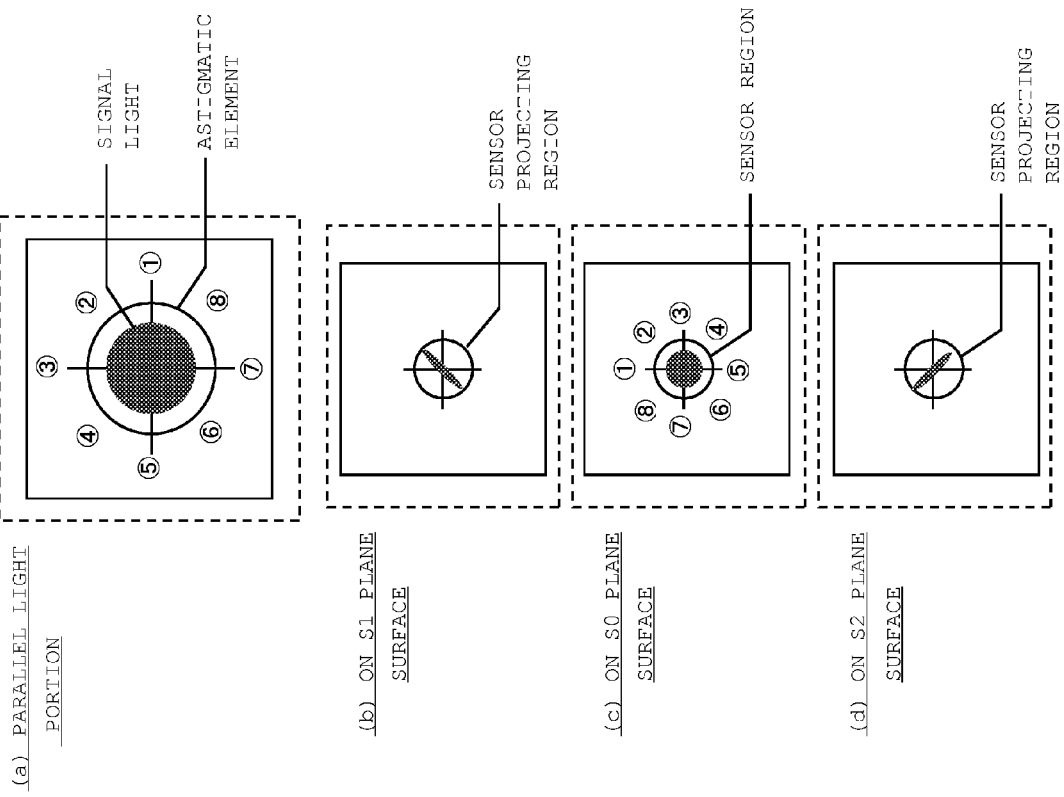
FIGS. 1A and 1B are diagrams each describing a technical principle (a manner in which a light ray advances) according to an embodiment.
Figure 1A:
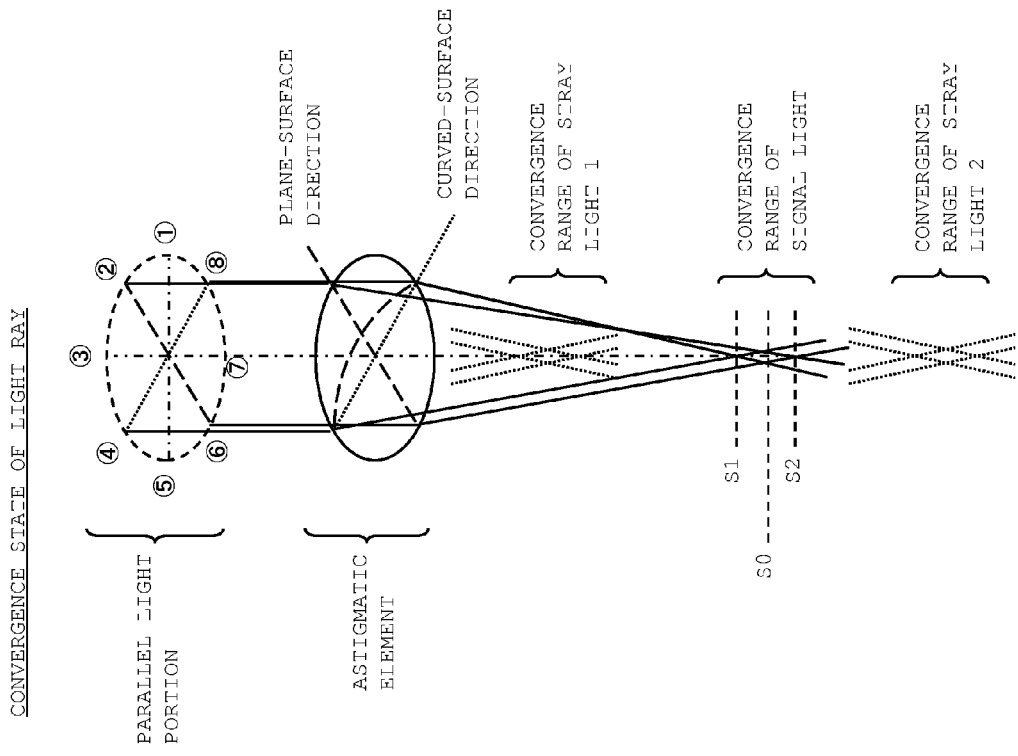

FIG. 1A is a diagram showing a convergence state of a signal light and a stray light, when the laser light (signal light) reflected by a target recording layer enters an astigmatic element, such as an anamorphic lens, in a state of a parallel light. A "stray light 1" is a laser light reflected by a recording layer present on a farther side by one layer than the target recording layer when seen from the side of a laser-light entering surface, and a "stray light 2" is a laser light reflected by a recording layer present on a nearer side by one layer than the target recording layer. FIG. 1A also shows a state when the signal light is focused on the target recording layer.

As illustrated, because of the effect of an anamorphic lens, a focal line occurs on a surface S1 due to the convergence of the signal light in a "curved-surface direction" shown in FIG. 1, and furthermore, a focal line occurs on a surface S2 due to the convergence of the signal light in a "plane-surface direction" shown in FIG. 1, which is vertical to the curved-surface direction. Thus, a spot of the signal light becomes minimum (circle of least confusion) on a surface S0 between the surfaces S1 and S2. In the case of a focus adjustment based on an astigmatic method, the surface S0 is situated as a light-receiving surface of a photodetector. It should be noted that in order to simplify the description of the astigmatic effect in the anamorphic lens, the "curved-surface direction" and the "plane-surface direction" are simply expressed for the sake of convenience, and in reality, it suffices that the effect for connecting the focal lines in positions different to each other occurs by the anamorphic lens. In this case, the anamorphic lens may also have a curvature in the "plane-surface direction" shown in FIG. 1A. When a laser light is incident, in a converged state, upon an anamorphic lens, the shape of the anamorphic lens in a "plane direction" may be linear (radius of curvature=∞).

As shown in FIG. 1A, a focal line position of the stray light 1 (in FIG. 1A, a range between the two focal line positions by the astigmatic element is shown as a "convergence range") is closer to the astigmatic element as compared to the focal line position of the signal light, while a focal line position of the stray light 2 is further away from the astigmatic element as compared to the focal line position of the signal light.

FIGS. 1B(a) to 1B(d) are diagrams each showing a beam shape of the signal light in the parallel light portion and on the surfaces S1, S0, and S2, respectively. The signal light that has been entered on the astigmatic element in a true circle becomes elliptical on the surface S1, then after becoming a substantially true circle on the surface S0, it again becomes elliptical on the surface S2. Herein, the beam shapes formed on the surface S1 and on the surface S2, the respective long axes are vertical to each other.

As shown in FIGS. 1A and 1B(a), if eight positions (Positions 1 to 8: written by encircled numeric figures in FIGS. 1A and 1B) are set up in the anti-clockwise direction on the outer circumference of the beam in the parallel light portion, a light ray passing through the positions 1 to 8 each experiences convergence effect by the astigmatic element. The position 4 and the position 8 are positioned on a parting line when a beam cross section of the parallel light portion is split into two by a parallel straight line in the curved-surface direction, while the position 2 and the position 6 are positioned on a parting line when the beam cross section of the parallel light portion is split into two by a parallel straight line in the plane-surface direction. The Positions 1, 3, 5, and 7 are in the middle of the outer circular arc sectioned by the positions 2, 4, 6, and 8, respectively.

The light ray passing through the position 4 and the position 8 in the parallel light portion enters the surface S0 after being converged to the focal line in the curved-surface direction on the surface S1. Thus, the light ray passing through these positions 4 and 8 passes through the positions 4 and 8 shown in FIG. 1B(c), on the surface S0. Similarly, the light ray passing through the positions 1, 3, 5, and 7 in the parallel light portion also enters the surface S0 after being converged to the focal line in the curved-surface direction on the surface S1, and as a result, the light ray passes through the positions 1, 3, 5, and 7 shown in FIG. 1B(c), on the surface S0. In contrast to this, the light ray passing through the positions 2 and 6 in the parallel light portion enters the surface S0 without being converged to the focal line in the curved-surface direction, on the surface S1. Thus, the light ray passing through these positions 2 and 6 passes through the positions 2 and 6 shown in FIG. 1B(c), on the surface S0.

Figure 2B:
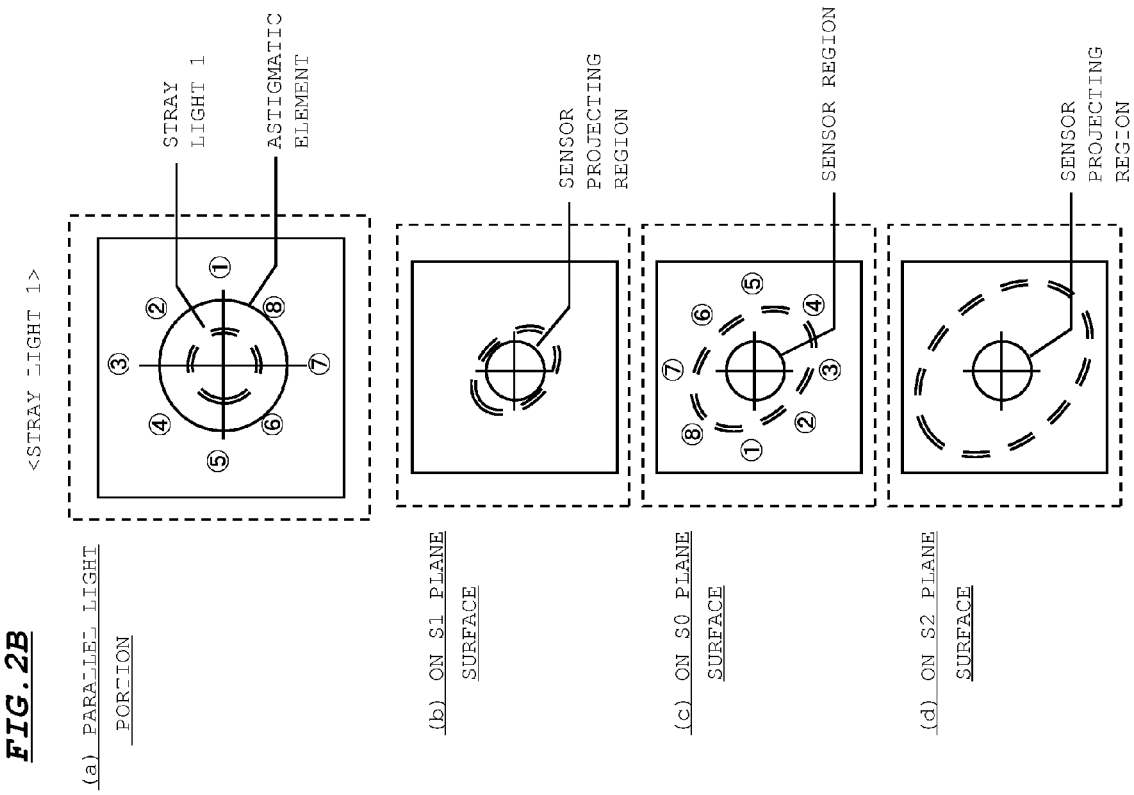
FIGS. 2A and 2B are diagrams each describing the technical principle (a manner in which a light ray advances) according to the embodiment.
Figure 2A:
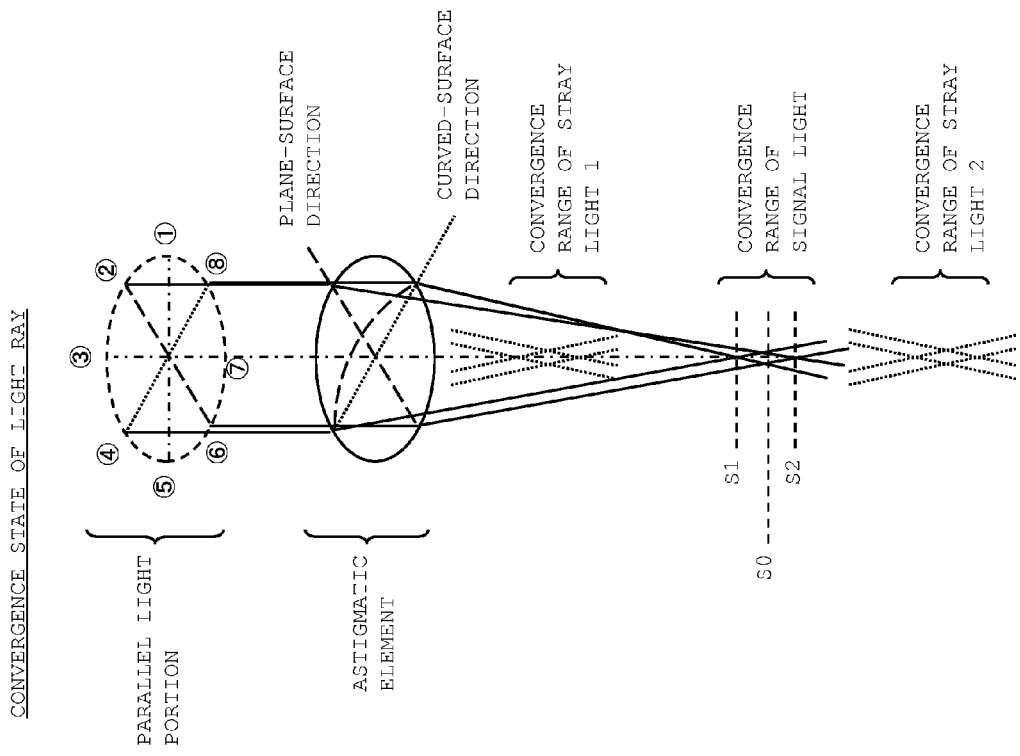

FIGS. 2B(a) to 2B(d) are diagrams each showing beam shapes and light ray passage positions of the stray light 1 in the parallel light portion and on the surfaces S1, S0, and S2, respectively. As shown in FIG. 2B(a), similar to the case of the aforementioned signal light, if eight positions 1 to 8 are set up on the outer circumference of the stray light 1, the light ray passing through these eight positions 1 to 8 enters on the surface S0 after being converged either to the focal line in the curved-surface direction or to the focal line in the plane-surface direction. Thus, the light ray passing through the positions 1 to 8 in the parallel light portion respectively passes through the positions 1 to 8 shown in FIG. 2B(c), on the surface S0.

Figure 3A:
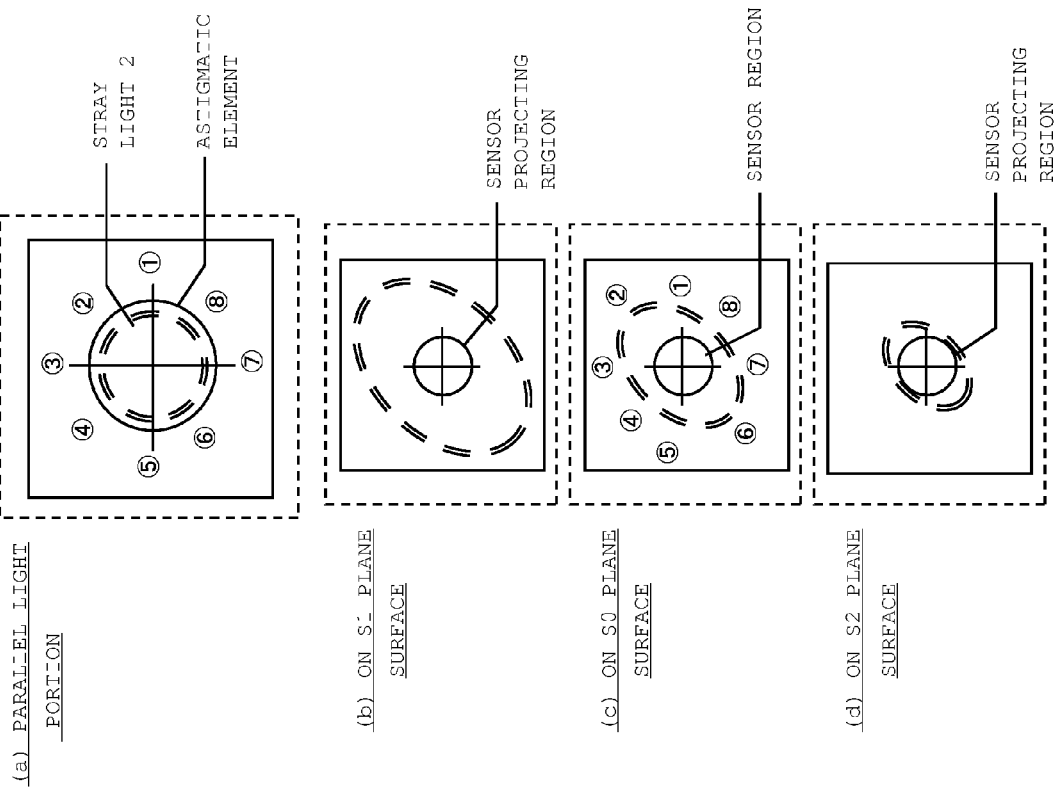
FIGS. 3A and 3B are diagrams each describing the technical principle (a manner in which a light ray advances) according to the embodiment.
Figure 3B:
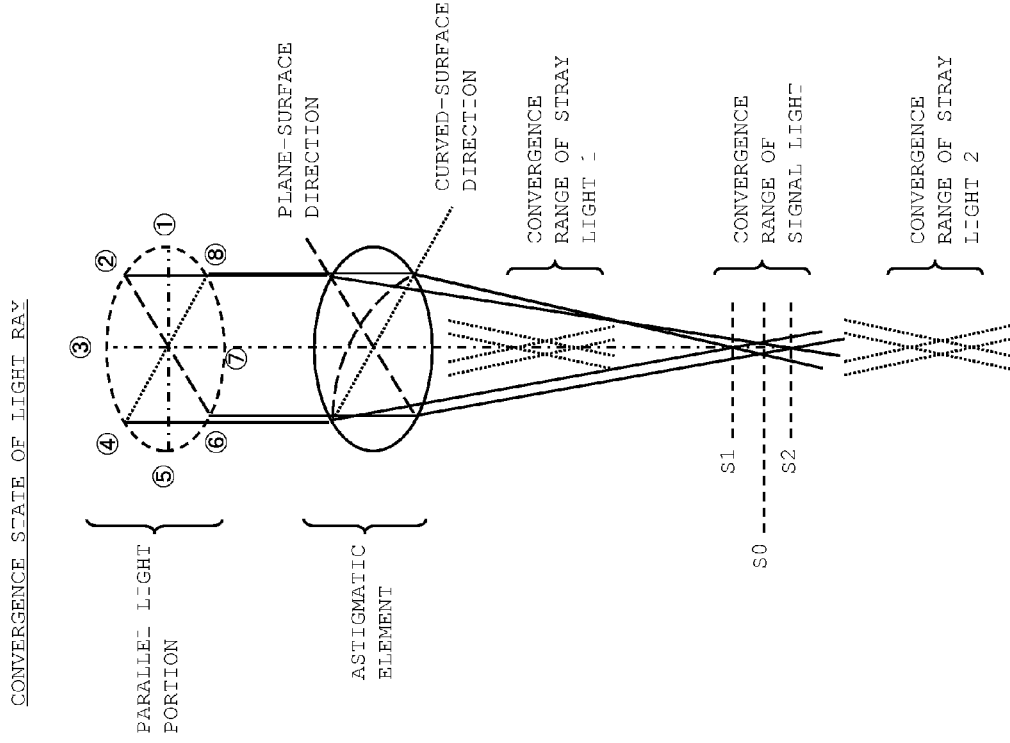

FIGS. 3B(a) to 3B(d) are diagrams each showing beam shapes and light ray passage positions of the stray light 2 in the parallel light portion and on the surfaces S1, S0, and S2, respectively. As shown in FIG. 3B(a), similar to the case of the aforementioned signal light, if eight positions 1 to 8 are set up on the outer circumference of the stray light 2, the light ray passing through these eight positions enters the surface S0 without being converged either to the focal line in the curved-surface direction or to the focal line in the plane-surface direction. Thus, the light ray passing through the positions 1 to 8 in the parallel light portion respectively passes through the positions 1 to 8 shown in FIG. 3B(c), on the surface S0.

FIG. 4 is a diagram in which the beam shapes and the light ray passage positions in the parallel light portion and on the surfaces S1, S0, and S2, described above, are shown by comparing among the signal light, the stray light 1, and the stray light 2. As can be understood by comparing rows shown in FIG. 4(c), luminous fluxes of the signal light, the stray light 1, and the stray light 2 passing through the position 1 in the parallel light portion pass through outer circumference positions different to one another, on the surface S0. Similarly, also the luminous fluxes of the signal light, the stray light 1, and the stray light 2 passing through the positions 3, 4, 5, 7, and 8 in the parallel light portion pass through outer circumference positions different to one another, on the surface S0. The luminous fluxes of the signal light and the stray light 2 passing through the positions 2 and 6 in the parallel light portion pass through the same outer circumference position on the surface S0. Also in this case, the luminous fluxes of the signal light and the stray light 1 passing through the positions 2 and 6 in the parallel light portion pass through outer circumference positions different to one another on the surface S0, and the luminous fluxes of the stray light 1 and the stray light 2 passing through the positions 2 and 6 in the parallel light portion pass through outer circumference positions different to one another on the surface S0.

Subsequently, in consideration of the phenomenon, a relationship between region splitting patterns of the signal light and the stray lights 1 and 2 in the parallel light portion, and irradiating regions of the signal light and the stray lights 1 and 2 on the surface S0 will be examined.

Firstly, as shown in FIG. 5A, the signal light and the stray lights 1 and 2 in the parallel light portion are split by two straight lines inclined at 45 degrees relative to the plane-surface direction and the curved-surface direction, to form four sections, i.e., luminous flux regions A to D. It should be noted that this splitting pattern corresponds to a region split based on the conventional astigmatic method.

In this case, based on the aforementioned phenomenon, the signal light of the luminous flux regions A to D is distributed on the surface S0 as shown in FIG. 5B. Furthermore, based on the aforementioned phenomenon, the stray light 1 and stray light 2 in the luminous flux regions A to D are distributed as shown in FIGS. 5C and 5D, respectively.

Herein, if the signal light and the stray lights 1 and 2 on the surface S0 are extracted for each luminous flux region, the distribution of each light will be as shown in FIGS. 6A to 6D. In such a case, either one of the stray light 1 or the stray light 2 in the same luminous flux region overlaps the signal light in each luminous flux region all the time. Therefore, if the signal light in each luminous flux region is received by a sensor pattern on a photodetector, at least the stray light 1 or the stray light 2 in the same luminous flux region will simultaneously enter the corresponding sensor pattern, thus causing a degradation of the detection signal.

In contrast to this, as shown in FIG. 7A, the signal light and the stray lights 1 and 2 in the parallel light portion are split by two straight lines parallel to the plane-surface direction and the curved-surface direction, to form four sections, i.e., luminous flux regions A to D. In such a case, based on the aforementioned phenomenon, the signal light of the luminous flux regions A to D is distributed on the surface S0 as shown in FIG. 7B. Furthermore, based on the aforementioned phenomenon, the stray light 1 and the stray light 2 of the luminous flux regions A to D are distributed as shown in FIGS. 7C and 7D, respectively.

Herein, if the signal light and the stray lights 1 and 2 on the surface S0 are extracted for each luminous flux region, the distribution of each light will be as shown in FIGS. 8A to 8D. In such a case, neither the stray light 1 nor the stray light 2 in the same luminous flux region overlaps the signal light in each luminous flux region. Therefore, after scattering the luminous fluxes (the signal light, and the stray lights 1 and 2) within each luminous flux region in different directions, if the configuration is such that only the signal light is received by the sensor pattern, only the signal light will enter the corresponding sensor pattern, and the entry of the stray light can be inhibited. Thus, the degradation of the detection signal due to the stray light can be avoided.

As described above, the signal light and the stray lights 1 and 2 are split into the four luminous flux regions A to D by two straight lines parallel to the plane-surface direction and the curved-surface direction, and by dispersing the light passing through these luminous flux regions A to D, and then alienating it on the surface S0, it becomes possible to extract only the signal light. The embodiment is based on this principle.

Figure 9A:
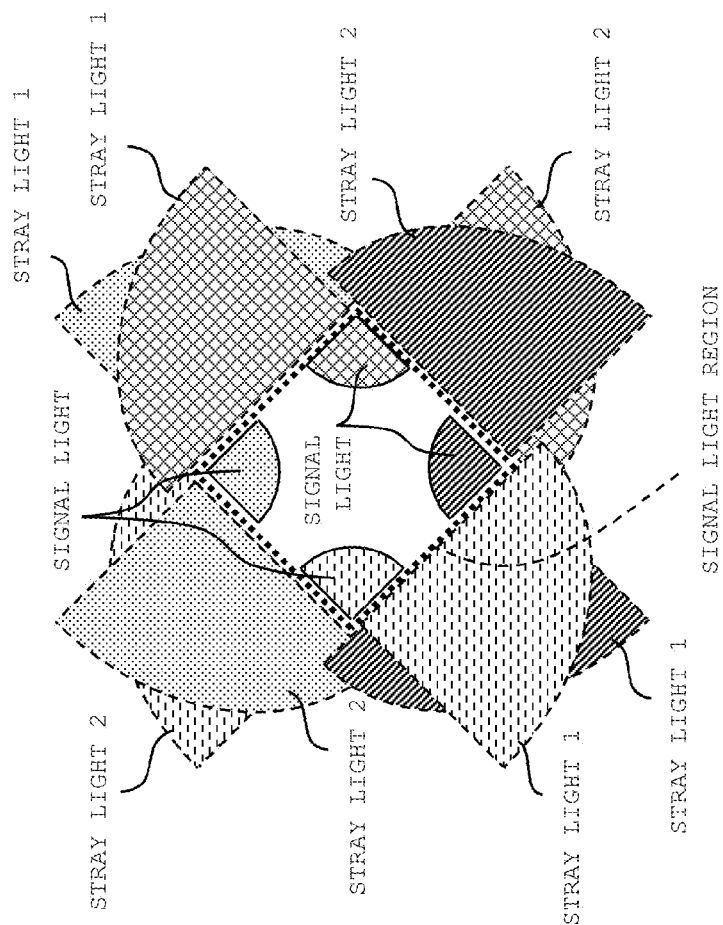
FIGS. 9A and 9B are diagrams each describing the technical principle (an angular provision and a distribution of a luminous flux) according to the embodiment.
Figure 9B:
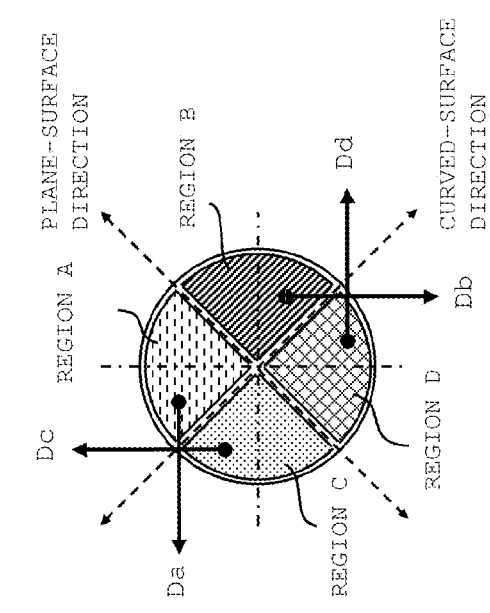

FIGS. 9A and 9B are diagrams each showing distribution states of the signal light and the stray lights 1 and 2 on the surface S0, when advancing directions of the luminous fluxes (the signal light, and the stray lights 1 and 2) passing through the four luminous flux regions A to D shown in FIG. 7A are changed by the same angle in the respectively different directions. Herein, as shown in FIG. 9A, the advancing directions of the luminous fluxes (the signal light, and the stray lights 1 and 2) passing through the luminous flux regions A to D are changed by the same angular amount α (not shown) in the directions Da, Db, Dc, and Dd, respectively. Each of the directions Da, Db, Dc, and Dd are inclined at 45 degrees relative to the plane-surface direction and the curved-surface direction.

In such a case, by regulating the angular amount α in the directions Da, Db, Dc, and Dd, the signal light and the stray lights 1 and 2 in each luminous flux region can be distributed on the plane surface S0, as shown in FIG. 9B. As a result, as shown in FIG. 9B, a signal light region containing only the signal light can be set up on the plane surface S0. By setting a sensor pattern of the photodetector in this signal light region, only the signal light of each region can be received by the corresponding sensor pattern.

Figure 10A:
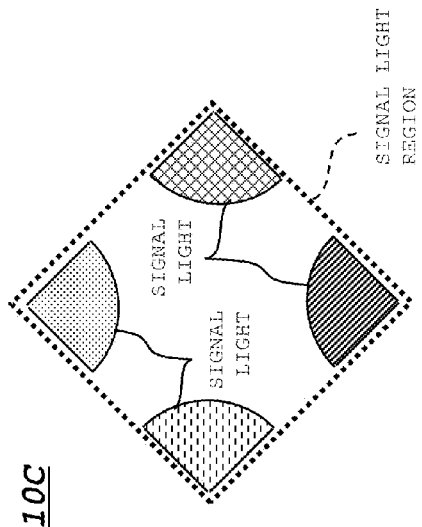
FIGS. 10A to 10D are diagrams each describing a method for placing a sensor pattern according to the embodiment.
Figure 10C:
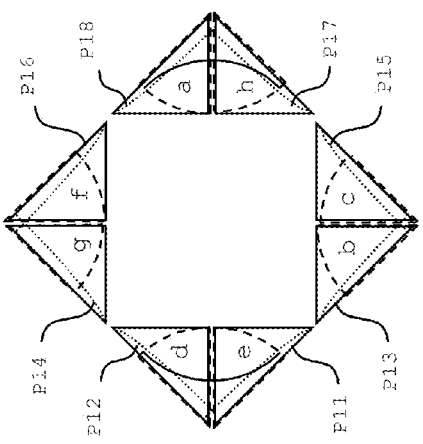
Figure 10B:
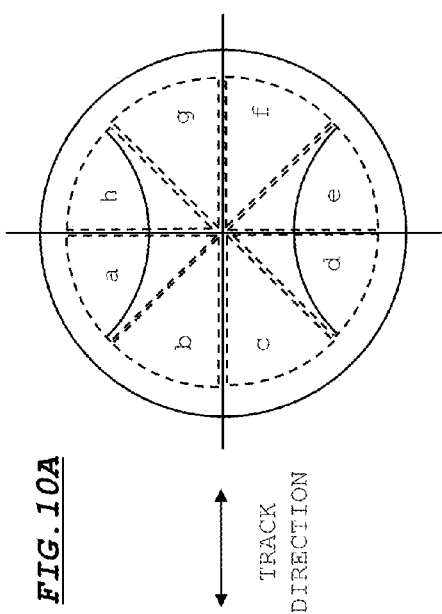
Figure 10D:
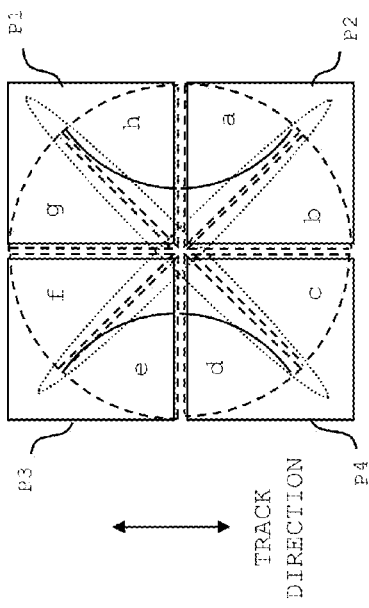

FIGS. 10A to 10D are diagrams each describing a method for placing the sensor pattern to generate a focus error signal and a push-pull signal. FIGS. 10A and 10B are diagrams each showing a splitting method of the luminous flux and the sensor pattern based on the conventional astigmatic method, while FIGS. 10C and 10D are diagrams each showing a splitting method of the luminous flux and the sensor pattern based on the aforementioned principle. Herein, a track direction has an inclination of 45 degrees relative to a planar direction and a curvature direction. In FIGS. 10A and 10B, for illustration purposes, the luminous flux is sectioned into eight luminous flux regions a to h. Furthermore, the diffracted image due to the track groove (track image) is shown by the solid line and the shape of the beam when off focus is shown by the dotted line.

An overlapped state between a zero-order diffraction image and a first-order diffraction image of a signal light by a track groove is known to be evaluated from "wavelength/((track pitch)×(objective lens NA))". A condition under which the first-order diffraction image is contained in the four luminous flux regions a, d, e, and h, as shown in FIG. 10A, FIG. 10B, and FIG. 10D, is: wavelength/((track pitch)×(objective lens NA))>√2.

In the conventional astigmatic method, sensor patterns P1 to P4 (quadratic sensor) of a photodetector are set as shown in FIG. 10B. In such a case, if detection signal components based on the light intensity of the luminous flux regions a to h are represented by A to H, a focus error signal FE is evaluated by an arithmetic operation of: FE=(A+B+E+F)−(C+D+G+H), and a push-pull signal PP is evaluated by an arithmetic operation of PP=(A+B+G+H)−(C+D+E+F).

In contrast to this, in the case of the distribution state in FIG. 9B, as described above, the signal light is distributed within the signal light region according to the state shown in FIG. 10C. In such a case, if the distribution of the signal light passing through the luminous flux regions a to h shown in FIG. 10A is overlapped on the distribution shown in FIG. 10C, a distribution as shown in FIG. 10D results. That is, the signal light passing through the luminous flux regions a to h in FIG. 10A is guided into the luminous flux regions a to h shown in FIG. 10D, on the surface S0 on which the sensor pattern of the photodetector is installed.

Therefore, if the sensor patterns P11 to P18 that are shown to be overlapped in FIG. 10D are set to the positions of the luminous flux regions a to h shown in FIG. 10D, the focus error signal and push-pull signal can be generated by the same arithmetic process as that in FIG. 10B. That is, also in this case, if the detection signals from the sensor patterns receiving the luminous flux of the luminous flux regions a to h are represented by A to H, similar to the case in FIG. 10B, the focus error signal FE can be acquired by an arithmetic operation of FE=(A+B+E+F)−(C+D+G+H), and the push-pull signal PP can be acquired by an arithmetic operation of PP=(A+B+G+H)−(C+D+E+F).

As described above, according to this principle, a signal light and stray lights 1 and 2 at a parallel light portion are divided into four luminous flux regions A to D by two straight lines parallel to a plane-surface direction and a curved-surface direction of FIG. 1A. The light passing through the luminous flux regions A to D is dispersed. Further, the dispersed signal light in each of the luminous flux regions A to D is received individually by light receiving units (two-division sensors) divided into two portions. This enables the production of a focus error signal and a push-pull signal (tracking error signal) by using an arithmetic process is similar to that based on the conventional astigmatic method.

In the above case, push-pull signal PP is acquired by an arithmetic operation of PP=(A+B+G+H)−(C+D+E+F) modeled upon the conventional producing method shown in FIG. 10B. However, in the conventional arithmetic technique, a problem arises that a DC component based on a shift (optical axis deviation) in the objective lens with respect to the laser optical axis is superimposed on the produced push-pull signal (tracking error signal).

Such a DC component may be effectively suppressed in a sensor pattern shown in FIG. 10D when a calculation of the push-pull signal (tracking error signal) is corrected as shown below.

Hereafter, together with results of the simulation performed by the present inventors of the subject application, a technique of producing a push-pull signal (tracking error signal) enabling effective suppression of the DC component will be described.

FIG. 11 is a diagram showing an optical system used for the simulation. In FIG. 11, reference numeral 10 denotes a semiconductor laser for emitting a laser light at a wavelength of 405 nm; 11 is a polarizing beam splitter for reflecting substantially all the laser light emitted from the semiconductor laser 10; 12 is a collimate lens for converting the laser light into a parallel light; 13 is a ¼ wavelength plate for converting the laser light (linear polarization light) incident from the collimate lens 12 side into a circularly polarized light; 14 is an aperture for adjusting the shape of a beam of the laser light to a complete circle about a laser optical axis; 15 is an objective lens for converging the laser light onto a disc; 16 is a detection lens for introducing an astigmatism into a reflected light from the disc transmitting the polarizing beam splitter 11; 17 is an angle adjusting element for imparting an operation described with reference to the preceding FIG. 9A to a laser light; and 18 is a photodetector.

As described with reference to the preceding FIG. 9A, the angle adjusting element has an operation which mutually isolates the laser light passing through four luminous flux regions A to D so as to distribute on the light detecting surface the laser light passing through the respective luminous flux regions as shown in FIG. 9B.

Design conditions for the optical system are shown as follows:
(1) Approach-route factor: 10 magnifications;
(2) Return-route factor: 18 magnifications;
(3) Spectral angle imparted by angle adjusting element 16: 1.9 degrees;
(4) Distance (air conversion) between a spectral surface of the angle adjusting element 17 and a detection surface of the photodetector 18: 3 mm;
(5) Spot diameter on light detecting surface when angle adjusting element 16 is not disposed: 60 μm; and
(6) Displacement distance for each signal light (respectively passing through luminous flux regions A to D) on the light detecting surface when angle adjusting element 16 is disposed: 100 μm.
(7) A spread angle of the laser light: vertical spread angle=20.0 degrees and horizontal spread angle=9.0 degrees;
(8) Lens effective aperture: φ=2.4 mm;
(9) Numerical aperture of lens: 0.85; and
(10) Disc track pitch: 0.32 μm.

The approach-route factor (1) is a ratio of a focal length of the collimate lens relative to a focal length of the objective lens. The return-route factor (2) is a ratio of synthetic focal lengths of the detection lens and the collimate lens, relative to the focal length of the objective lens. In this optical system, the laser light (signal light) reflected by the disc forms a least circle of confusion on the detection surface when the angle adjusting element 17 is eliminated. The spot size in (5) is the diameter of this least circle of confusion.

Furthermore, the displacement distance in (6) above is a distance between an optical axial center of the signal light on the detection surface when the angle adjusting element 16 is removed and an apical position (position of the apex when a fan shape shown in FIG. 8A to FIG. 8D is a right angle) of the respective signal light when the angle adjusting element 16 is disposed. Dimensional conditions for the sensor pattern are as shown in FIG. 12A.

The vertical spread angle in the condition (7) means a spread angle of a laser light in an interlaminar direction of the semiconductor layer of the laser element housed in the optical pickup apparatus 10, and the horizontal spread angle means a spread angle of a laser light in a direction parallel to the semiconductor layer. Herein, the spread angle, as shown in FIG. 12B, is defined to be a spread angle of a beam portion having an intensity equal to or greater than half a peak intensity P. The lens effective aperture in the condition (8) means the diameter of a beam formed when being incident on the objective lens 15 after passing through the aperture 14.

The laser light emitted from the semiconductor laser 10 differs with respect to the spread angles in vertical and horizontal directions, as described above. Thus, in a parallel luminous flux toward the collimate lens 12 from the aperture 14, a bias occurs in the intensity distribution based on the difference in the spread angles. FIG. 12D is a diagram schematically showing the bias in intensity in the parallel luminous flux. In FIG. 12D, a white portion indicates high intensity and a hatched portion indicates low intensity. The left side of FIG. 12D indicates a non-deviation state of the optical axis of the objective lens with respect to the laser optical axis. The right side of FIG. 12D indicates a state (a lens shift is present) in which the optical axis of the objective lens is shifted in a direction transverse the track with respect to the laser optical axis. In FIG. 12D, dividing lines in the plane-surface direction and the curved-surface direction shown in FIG. 9A are shown in an overlapped manner.

Figure 13:
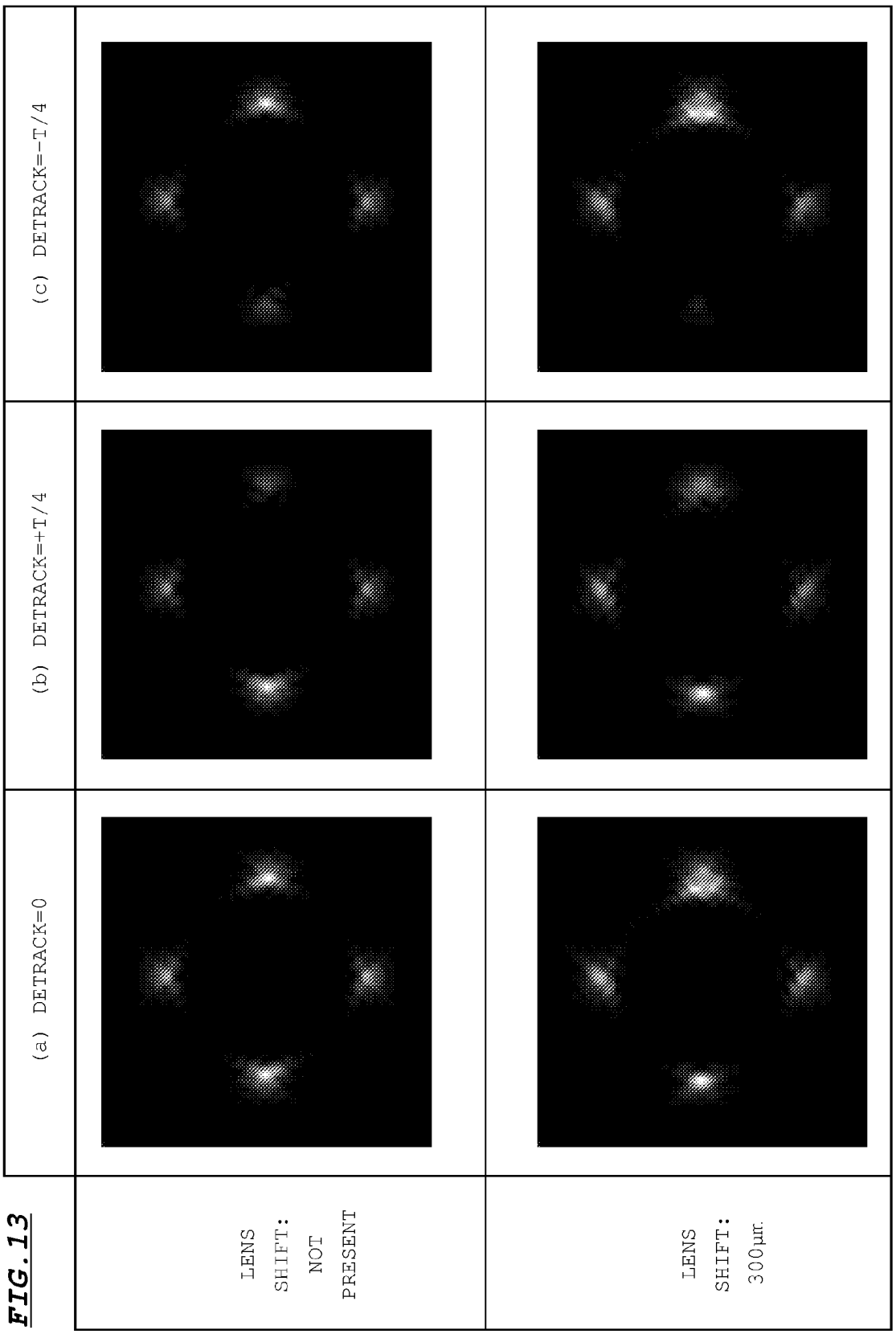
FIG. 13 is a diagram showing simulation results when verifying a light amount balance of a signal light when a lens shift occurs.

FIG. 13 shows simulation results obtained by simulating the intensity of a signal light when the lens shift is present or absent under the preceding conditions. The upper level in FIG. 13 shows the simulation results obtained by simulating the intensity of a signal light when the beam spot on the disc is positioned at a track center and when it deviates from the track center in a disc radial direction, in a state where no lens shift is present. The lower level of FIG. 13 shows the simulation results obtained by simulating the intensity of a signal light when the beam spot on the disc is positioned at the track center and when it deviates from the track center in the disc radial direction, in a state where the lens shift is 300 μm.

"Detrack=+T/4" indicates that the beam spot is deviated in an outer circumferential direction of the disc by ¼ the track pitch from the track center. "Detrack=−T/4" indicates that the beam spot is deviated in an inner circumferential direction of the disc by ¼ the track pitch from the track center. Moreover, "Detrack=0" indicates that the beam spot deviation (detrack) relative to the track center does not occur.

With reference to the upper level of FIG. 13, when the beam spot is positioned at the track center, the intensity of two left and right signal lights, out of four signal lights, is equal. When the beam spot deviates in the outer or inner circumferential direction of the disc from the track center, a difference occurs in the intensity of the two left and right signal lights depending on the direction of deviation. Thus, when there is no lens shift, it is possible to appropriately evaluate the push-pull signal (tracking error signal) by evaluating an intensity difference between the two left and right signal lights based on an output signal from the sensor for receiving the two left and right signal lights.

In contrast, if reference is made to the simulation results on the lower-level left end of FIG. 13, irrespective of the fact that the beam spot is positioned at the track center, the intensity difference occurs in the two left and right signal lights. That is, in this case, the intensity of the right-side signal light is greater than the intensity of the left-side signal light. Moreover, the intensity difference between the right-side signal light and the left-side signal light is smaller in the simulation results in the lower-level center of FIG. 13 than in the simulation results in the upper-level center. Conversely, the intensity difference between the right-side signal light and the left-side signal light is greater in the simulation results in the lower-level right end of FIG. 13 than in the simulation results of the upper-level right end. Thus, when the lens shift occurs, the left and right balance of the signal light becomes inappropriate, and as a result, even when the intensity difference between the two left and right signal lights is evaluated based on the output signal from the sensor for receiving the two left and right signal lights, it is not possible to appropriately evaluate the push-pull signal (tracking error signal). That is, in this case, the DC component based on the lens shift becomes superimposed on the push-pull signal.

Subsequently, when the two upper and lower signal lights, out of the four signal lights, are investigated, the three simulation results in the upper level of FIG. 13 show that the left and right intensity balance of the two upper and lower signal lights is equal irrespective of the presence or absence of the detrack. On the other hand, the three simulation results in the lower level of FIG. 13 show that irrespective of the presence or absence of the detrack, a similar distortion occurs in the two upper and lower signal lights, and due to the distortion, the intensity balance in the left and right directions of the two upper and lower signal lights is unequal. That is, in this case, the intensity of the two upper and lower signal lights is biased towards the left side in either case.

It can be seen from the simulation results that when the lens shift occurs, the distortion occurs in the two upper and lower signal lights, and thus, the intensity of the two signal lights is biased in either a right or left direction. Thus, if the bias is evaluated based on the output signal from the sensor for receiving the two upper and lower signal lights, it is probable that the evaluated value mirrors the DC component based on the lens shift.

Therefore, the present inventors of the subject application evaluated a signal PP1 corresponding to the intensity difference between the left and right signal lights and a signal PP2 corresponding to the left or right bias in the intensity of the upper and lower signal lights through simulation, and based on the PP2, investigated whether it is possible to suppress the DC component contained in the push-pull signal (tracking error signal). In this case, PP1 and PP2 were evaluated using arithmetic expressions described in FIG. 12C. It should be noted that the conditions for the simulation are the same as those shown above.

Figure 14A:
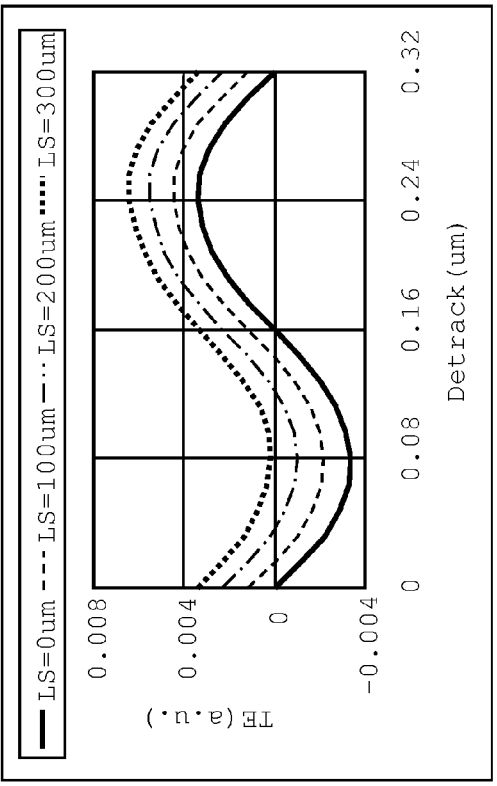
FIG. 14A to FIG. 14C are graphs each showing simulation results when verifying states of a push-pull signal when the lens shift occurs and signals PP1 and PP2.
Figure 14C:
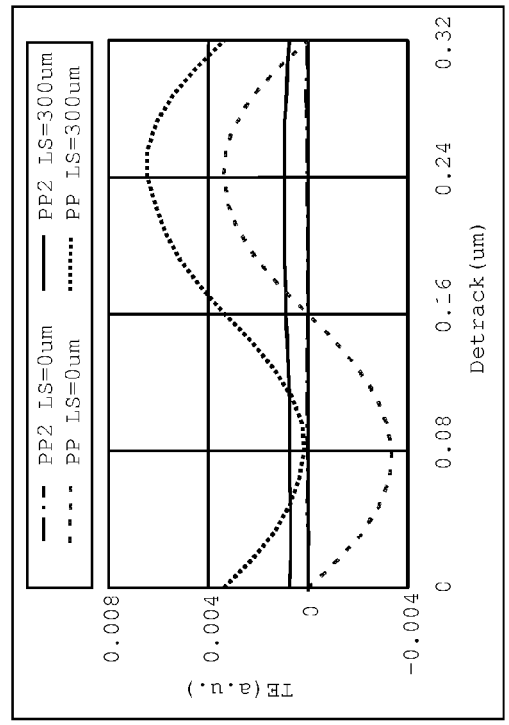
Figure 14B:
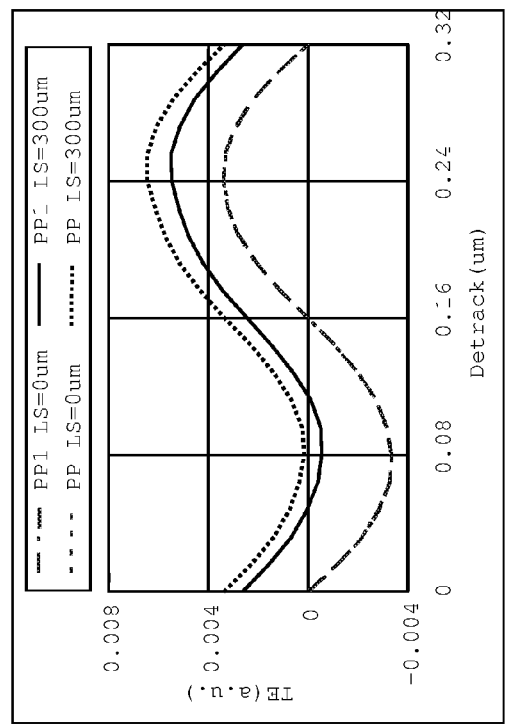

FIGS. 14A to 14C are graphs showing the simulation results.

FIG. 14A shows the simulation results obtained when evaluating a change in the push-pull signal (tracking error signal) at the time of changing a detrack amount. The detrack=0, 0.08, 0.24 on a horizontal axis in FIG. 14A correspond respectively to detrack=0, +T/4, and −T/4 in FIG. 13. In FIG. 14A, four simulation results obtained when the lens shift (LS) is 0 µm, 100 µm, 200 µm, and 300 µm are shown in combination. Herein, the push-pull signal (tracking error signal) is evaluated from the arithmetic expressions in FIG. 10D, i.e., evaluated by adding the signal PP1 to the signal PP2 (PP1+PP2). It can be seen from the simulation results that in accordance with an increase of the lens shift (LS), the push-pull signal (tracking error signal) is shifted upwardly and the DC component increases.

FIG. 14B is a graph showing simulation results obtained when a signal component of the signal PP1 is extracted from the simulation results of FIG. 14A. FIG. 14B shows the signal PP1 when the lens shift (LS) is 0 µm and 300 µm. Moreover, the push-pull signal (tracking error signal) PP when the lens shift (LS) is 0 µm and 300 µm is shown in combination. The signal PP1 and the push-pull signal PP when the lens shift (LS) is 0 µm are overlapped each other. It can be seen from the simulation results that in accordance with an increase of the lens shift (LS), the signal PP1 is shifted upwardly and the DC component increases.

FIG. 14C is a graph showing simulation results obtained when a signal component of the signal PP2 is extracted from the simulation results of FIG. 14A. FIG. 14C shows the signal PP2 when the lens shift (LS) is 0 µm and 300 µm. Furthermore, the push-pull signal (tracking error signal) PP when the lens shift (LS) is 0 µm and 300 µm is shown in combination. It can be seen from the simulation results that in accordance with an increase of the lens shift (LS), the signal PP2 increases. Therefore, it can be seen that when the push-pull signal (tracking error signal) PP is produced by adding the signal PP2 to the signal PP1 according to the conventional arithmetic expression shown in FIG. 10D, the DC component contained in the produced push-pull signal PP is more increased by the signal PP2 as compared to a case where the signal PP1 only is used.

As described above, it can be seen that the signal PP2 increases concurrently with the lens shift (LS), and thus, when the signal PP2 is subtracted from the signal PP1, it becomes possible to suppress the DC component without decreasing the push-pull component. Thus, the present inventors of the subject application set an arithmetic expression for evaluating the push-pull signal (tracking error signal) PP as:

$$PP=PP1-k \cdot PP2 \quad (1)$$

Then, verification was performed under the same conditions as above with respect to how it was possible to suppress the DC component by changing the variable k in the arithmetic expression.

FIGS. 15A to 15C are graphs each showing the simulation results.

FIG. 15A is a graph of a case where an offset amount (DC component) of the push-pull signal (tracking error signal) with respect to the lens shift is simulated when a variable k takes values of k=−1, 1, 2, 3, and 4. A vertical axis shows a ratio of the offset amount (DC component) to a magnitude (difference between maximum positive and negative values) of the tracking error signal. The simulation results when k=−1 correspond to a case where the push-pull signal (tracking error signal) PP is evaluated using the conventional arithmetic expression (PP=PP1+PP2) shown in FIG. 10D.

It can be seen from the simulation results that when the variable k is set to a value of k=3, it becomes possible to maintain the offset amount (DC component) of the push-pull signal (tracking error signal) to substantially zero irrespective of the size of the lens shift.

FIG. 15B is a graph of a case where the variable k is set to a value of k=−1 (conventional arithmetic expression), and the magnitude of the push-pull signal (tracking error signal) when the detrack amount is changed is evaluated through the simulation. The simulation results are the same as those in FIG. 14A. In this case, as described above, in accordance with an increase of the lens shift, the DC component of the push-pull signal (tracking error signal) increases.

FIG. 15C is a graph of simulation results when based on the simulation results of FIG. 15A, the variable k is set to a value of k=3 and the simulation similar to that in FIG. 15B is performed. As can be seen from the simulation results, when the variable k is set to a value of k=3, it becomes possible to effectively suppress the offset (DC component) of the push-pull signal (tracking error signal) irrespective of the size of the lens shift (LS).

As can be seen from the above simulation results, it is possible to effectively suppress the offset (DC component) of the push-pull signal (tracking error signal) irrespective of the size of the lens shift (LS) by evaluating the push-pull signal (tracking error signal) using the arithmetic operation in the expression (1), and furthermore, regulating the variable k at that time to the appropriate value. Therefore, when the arithmetic operation of the expression (1) is further applied to the basic principle described with reference to FIGS. 1A to 10D, it becomes possible to produce a high quality signal from which the influence of the stray light is eliminated, and at the same time, to effectively suppress the offset (DC component) of the push-pull signal (tracking error signal).

The value of the variable k may vary depending on the used optical system. Thus, when mounting the optical pickup apparatus in the optical disc apparatus, it is necessary to adjust, as required, the value of the variable k to the appropriate value.

In the above simulation, since the signal PP2 is evaluated using PP2=(G+B)−(F+C), when the variable k in the expression (1) takes a positive value, it becomes possible to effectively suppress the offset (DC component) of the push-pull signal (tracking error signal), as shown in FIG. 15A. However, when the signal PP2 is evaluated using PP2=(F+C)−(G+B), since the polarity of the signal PP2 is opposite to that above, in order to effectively suppress the offset (DC component) of the push-pull signal (tracking error signal), it is necessary for the variable k above to have a negative value. Thus, the polarity of the variable shown in the expression (1) needs to be adjusted, as required, even when the method of evaluating the signal PP2 is used. That is, it is necessary that the variable k has a positive value when the signal PP1 and the signal PP2 displace in the same direction concurrently with the lens shift and has a negative value when displacing in a different direction.

It should be noted that in the above-described description, the signal PP2 is evaluated from the both two upper and lower signal lights, and based on the evaluated signal PP2, the offset (DC component) of the push-pull signal (tracking error signal) is suppressed. However, also, it may be optionally possible to evaluate the signal PP2 from only either one of the two upper and lower signal lights so as to suppress the offset (DC component) of the push-pull signal (tracking error signal) based on the evaluated signal PP2. In this case, it is possible to evaluate the signal PP2 using an arithmetic operation of PP2=G−F, or PP2=B−C, for example. In this case, the size of the signal PP2 is about half the preceding case. Therefore, according thereto, it is necessary to regulate the variable k in the expression (1).

EMBODIMENT

An embodiment based on the principle will be described below.

Figure 16:
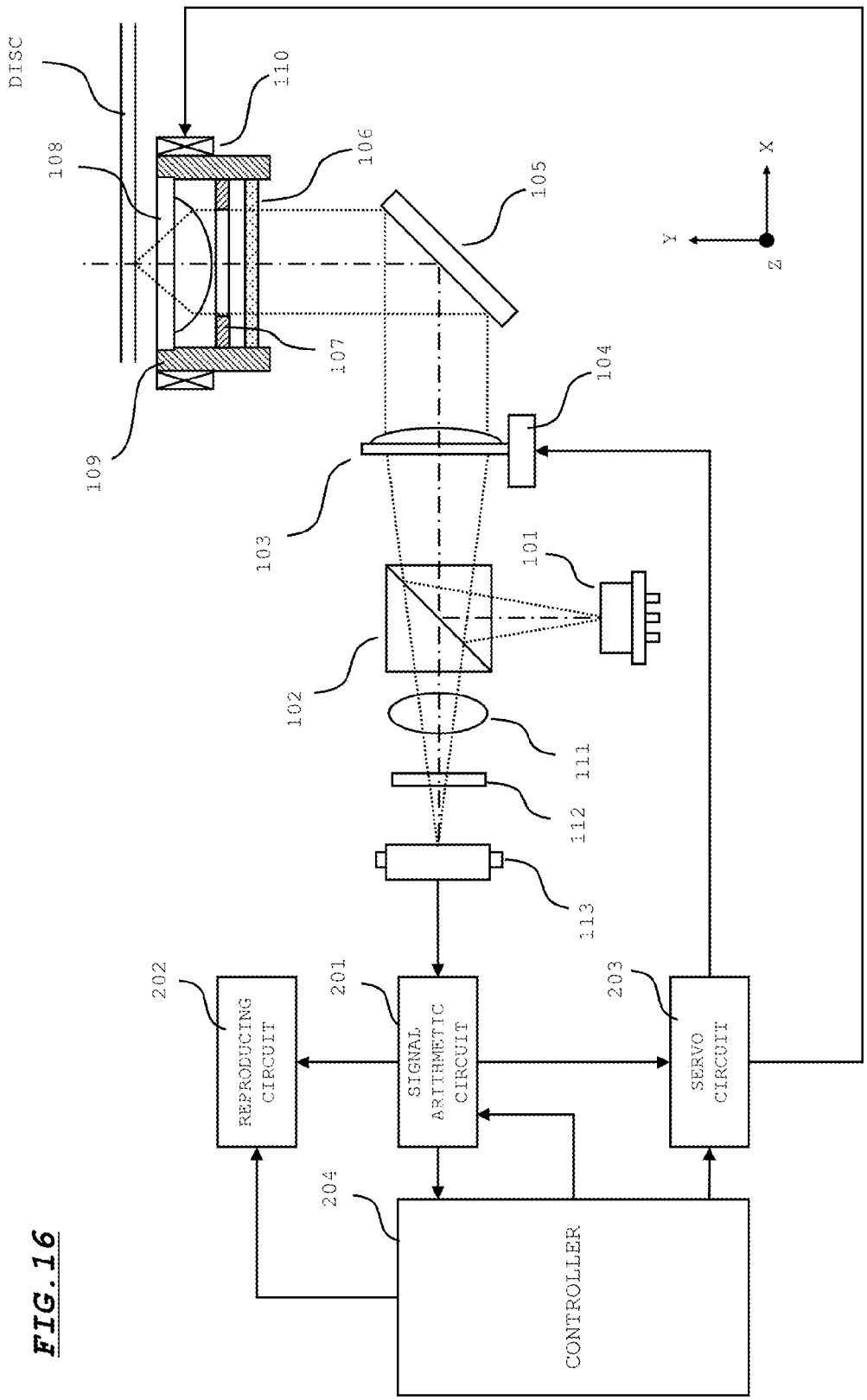
FIG. 16 is a diagram showing an optical system of an optical pickup apparatus according to an embodiment.

FIG. 16 depicts an optical system of the optical pickup apparatus according to the embodiment. It is noted that in FIG. 16, for the sake of convenience, a related circuit configuration is also shown. A plurality of recording layers are stacked and placed on a disc shown in FIG. 16.

As shown in FIG. 14, the optical system of the optical pickup apparatus is provided with: a semiconductor laser 101; a polarizing beam splitter 102; a collimating lens 103; a lens actuator 104; a startup mirror 105; a ¼ wavelength plate 106; an aperture 107; an objective lens 108; a holder 109; an objective lens actuator 110; a detection lens 111; an angle adjusting element 112; and a photodetector 113.

The semiconductor laser 101 emits a laser light of a predetermined wavelength. In the spread angle of the laser light emitted from the semiconductor laser 101, there is a difference between the horizontal spread angle and the vertical spread angle, similarly to the simulation above.

The polarizing beam splitter 102 substantially completely reflects the laser light (S polarized light) entering from the semiconductor laser 101, and at the same time, substantially completely transmits the laser light (P polarized light) entering from the collimating lens 103 side. The collimating lens 103 converts the laser light entering from the polarizing beam splitter 102 side into a parallel light.

The lens actuator 104 displaces the collimating lens 103 in an optical-axis direction according to a servo signal inputted from the servo circuit 203. This corrects an aberration caused in the laser light. The startup mirror 105 reflects the laser light entering from the collimating lens 103 side in a direction towards the objective lens 108.

The ¼ wavelength plate 106 converts the laser light towards the disc into a circularly polarized light, and at the same time, converts a reflected light from the disc into a linearly polarized light perpendicularly intersecting the polarization direction at the time of heading towards the disc. Thereby, the laser light reflected by the disc is transmitted through the polarizing beam splitter 102.

The aperture 107, similarly to the aperture 14 in FIG. 11, adjusts the shape of a beam of the laser light to a circular shape so that the effective aperture of the laser light is rendered appropriate with respect to the objective lens 108. The objective lens 108 is designed such that the laser light is converged appropriately in a target recording layer within the disc. The holder 109 holds the ¼ wavelength plate 106 and the objective lens 108 as a single piece. The objective lens actuator 110 is configured by a conventionally well-known electromagnetic driving circuit, and out of the circuit, a coil portion, such as a focus coil, is attached to the holder 109.

The detection lens 111 introduces astigmatism into the reflected light from the disc. That is, the detection lens 111 is equivalent to the astigmatic element of FIG. 1A. The detection lens 111 is so placed that the plane-surface direction and the curved-surface direction are respectively inclined at an angle of 45 degrees relative to the track image from the disc. When the detection lens 111 is placed in this manner, the plane-surface direction and the curved-surface direction of the detection lens 111 are set as shown in FIG. 12D with respect to the intensity distribution of the laser light.

The angle adjusting element 112 changes the advancing direction of the laser light entering from the detection lens 111 side according to the manner described with reference to FIGS. 9A and 9B. That is, the angle adjusting element 112 changes the advancing direction of the luminous flux, out of the laser light that has been entered, passing through the luminous flux regions A to D of FIG. 9A by the same angular amount α, in the directions Da to Dd, respectively. It is noted that the angular amount α is set in a manner that the distribution states of the signal light and the stray lights 1 and 2 on the surface S0 result in the distribution states in FIG. 9B.

The photodetector 113 has the sensor pattern shown in FIG. 10D. The photodetector 113 is placed in a manner that this sensor pattern is positioned at a location of the surface S0 of FIG. 1A. The eight sensors P11 to P18 shown in FIG. 10D are disposed in the photodetector 113, and each of these sensors receives the luminous flux passing through the luminous flux regions a to h of FIG. 10D.

A signal arithmetic circuit 201 performs the arithmetic process, as described with reference to FIG. 10D, on the detection signals outputted from the eight sensors of the photodetector 113, and generates a focus error signal. Furthermore, the signal arithmetic circuit 201 adds up these detection signals outputted from the eight sensors to generate a reproduction RF signal. Moreover, the signal arithmetic circuit 201 performs an arithmetic process according to the expression (1) on the detection signal outputted from the eight sensors of the photodetector 113 so as to produce the push-pull signal (tracking error signal). The generated focus error signal and push-pull signal are sent to a servo circuit 203, and the reproduction RF signal is sent to a reproduction circuit 202 and the servo circuit 203.

The reproduction circuit 202 demodulates the reproduction RF signal inputted from the signal arithmetic circuit 201 so as to generate reproduction data. The servo circuit 203 generates a tracking servo signal and a focus servo signal from the push-pull signal and the focus error signal inputted from the signal arithmetic circuit 201, and outputs these signals to the objective lens actuator 110. Furthermore, the servo circuit 203 outputs the servo signal to the lens actuator 104 such that the quality of the reproduction RF signal inputted from the signal arithmetic circuit 201 is optimized. The controller 204 controls each unit according to a program accommodated in the internal memory.

FIGS. 17A to 17C are diagrams each showing a configuration example of the angle adjusting element 112. FIG. 17A shows a configuration example in a case that the angle adjusting element 112 is configured by a hologram element having a diffraction pattern, while FIGS. 17B and 17C show configuration examples in a case that the angle adjusting element 112 is configured by a multi-faced prism.

Firstly, in the configuration example of FIG. 17A, the angle adjusting element 112 is formed by a square-shaped transparent plate, and has a hologram pattern being formed on the light-entering surface. As shown in FIG. 17A, the light-entering surface is sectioned into four hologram regions 112a to 112d. The angle adjusting element 112 is placed after the detection lens 111 so that the laser light (the signal light and the stray lights 1 and 2) passing through the luminous flux regions A to D of FIG. 9A enters in each of the hologram regions 112a to 112d.

The hologram regions 112a to 112d diffract the entered laser light (the signal light and the stray lights 1 and 2) in directions Va to Vd, respectively. The directions Va to Vd coincide with the directions Da to Dd of FIG. 9A. Thus, by means of diffraction, the hologram regions 112a to 112d change the advancing direction of the laser light (the signal light and the stray lights 1 and 2) entering from the polarization adjusting element 111 to the directions Da to Dd of FIG. 9A, respectively. A diffraction angle in each region is the same.

Herein, the diffraction angle is so adjusted that the laser light (the signal light and the stray lights 1 and 2) passing through the hologram regions 112a to 112d is distributed as shown in FIG. 9B, on the surface S0 of FIG. 1A. Thus, as described above, if the light-receiving surface of the photodetector 113 having the sensor pattern shown in FIG. 15A is placed on the surface S0, the corresponding signal light can be received properly by the aforementioned eight sensors P11 to P18.

It is noted that the diffraction efficiency of the hologram regions 112a to 112d is the same as one another. If the hologram formed in the hologram regions 112a to 112d is of a step-like structure, the diffraction efficiency is adjusted by the number of steps of the hologram pattern and the height for each step, and the diffraction angle is adjusted by a pitch of the hologram pattern. Therefore, in this case, the number of steps of the hologram pattern and the height for each step are set so that the diffraction efficiency of a previously determined diffraction order reaches an expected value, and also, the pitch of the hologram pattern is adjusted so that the diffraction angle in the diffraction order can provide the distribution shown in FIG. 9B.

It is noted that the hologram formed in the hologram regions 112a to 112d can also be of a blaze type. In this case, a higher diffraction efficiency can be achieved as compared to the step-like structured hologram.

In the configuration example of FIG. 17B, the angle adjusting element 112 is formed by a transparent body whose light-emitting surface is plane, and the light-entering surface is individually inclined in different directions in four regions. FIG. 17C is a view of FIG. 17B as seen from the light-entering surface side. As shown in FIG. 17C, on the light-entering surface of the angle adjusting element 112, four inclined surfaces 112e to 112h are formed. If a light ray enters these inclined surfaces from the light-entering surface side, in parallel to an X-axis, the advancing direction of the light will change in the direction of Ve to Vh shown in FIG. 17C, respectively, due to the refractive effect caused when the light enters the inclined surfaces 112e to 112h. Herein, the refraction angle in the inclined surfaces 112e to 112h is the same.

The angle adjusting element 112 of FIG. 17B is placed after the detection lens 111 so that the laser light (the signal light and the stray lights 1 and 2) passing through the luminous flux regions A to D of FIG. 9A enters the inclined surfaces 112e to 112h, respectively. If the angle adjusting element 112 is placed in this way, the refraction directions Ve to Vh on the inclined surfaces 112e to 112h coincide with the directions Da to Dd of FIG. 9A. Therefore, by means of the refraction, the inclined surfaces 112e to 112h change the advancing direction of the laser light (the signal light and the stray lights 1 and 2) entering from the detection lens 111 by a constant angle into the directions Da to Dd of FIG. 9A, respectively.

Herein, the refraction angle on each inclined surface is adjusted in a manner that the laser light (the signal light and the stray lights 1 and 2) passing through the inclined surfaces 112e to 112h is distributed as shown in FIG. 9B, on the surface S0 of FIG. 1. Thus, if the photodetector 113 having the sensor pattern shown in FIG. 10D is placed on the surface S0, the corresponding signal light can be received properly by the aforementioned eight sensors P11 to P18. Because such a refractive effect has a significantly small dependency on the wavelength as compared to the diffractive effect, the adaptability to a change in the wavelength of a light source or to a multi-wavelength light source is high.

It is noted that in the configuration example of FIG. 16A, the hologram regions 112a to 112d are imparted with only the diffractive effect of providing an angle for changing the advancing direction of the laser light by a constant angle. However, besides providing the angle, a hologram pattern that simultaneously exhibits an astigmatic effect caused by the detection lens 111 can also be set to the hologram regions 112a to 112d. Furthermore, it may be also possible that a hologram pattern for providing the aforementioned angle is formed on the light-entering surface of the angle adjusting element 112 and the light-emitting surface of the angle adjusting element 112 is imparted with the hologram pattern for imparting the astigmatic effect. Similarly, also in the angle adjusting element 112 of FIG. 16B, a lens surface may be formed on the light-emitting surface for introducing astigmatism. Alternatively, the inclined surfaces 112e to 112h can be shaped into curved surfaces, and the inclined surfaces 112e to 112h may be imparted with an astigmatic lens effect. In this way, the detection lens 111 can be omitted, and reductions in the number of parts and in cost can be achieved.

Figure 18:
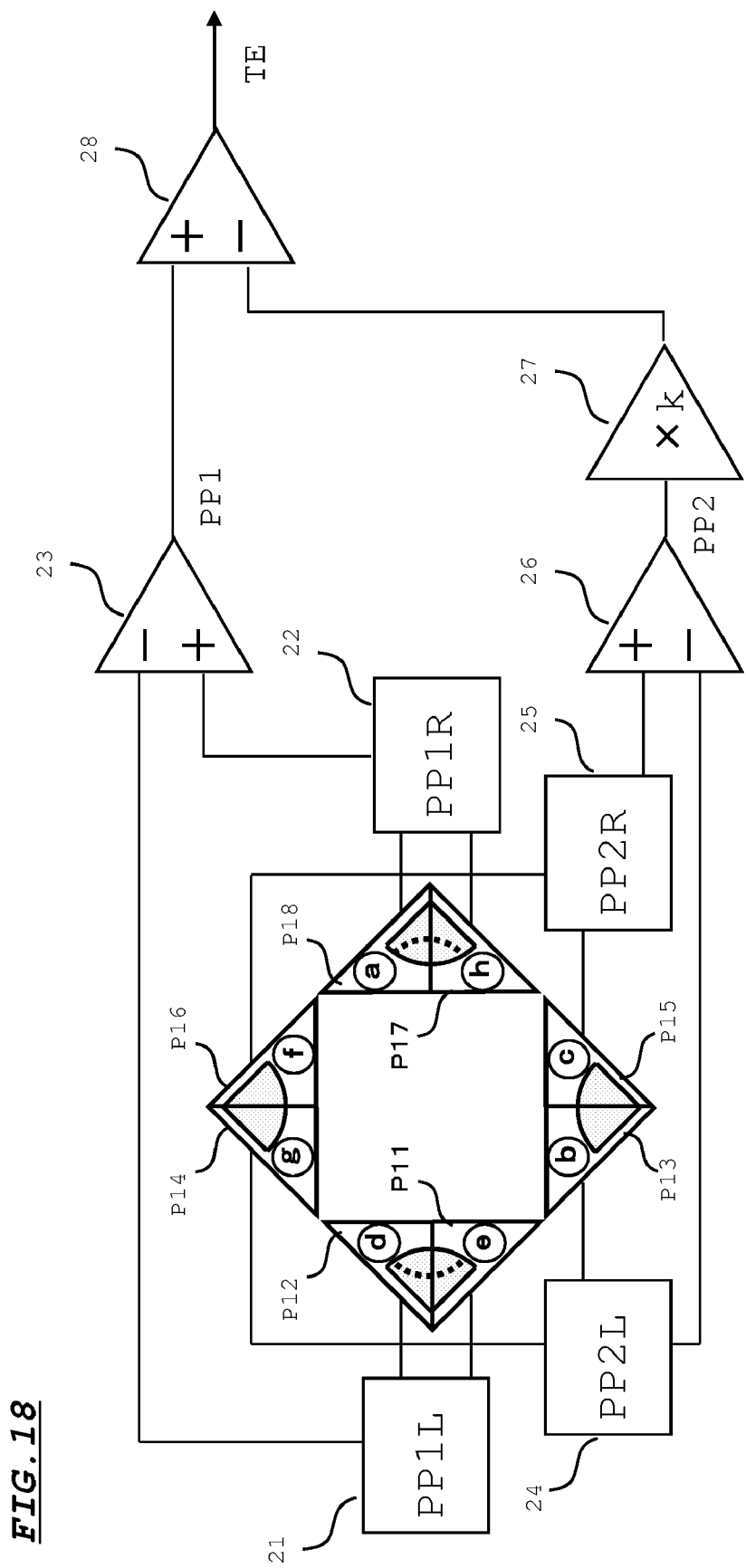
FIG. 18 is a diagram showing the configuration of an arithmetic circuit according to the embodiment.

FIG. 18 is a diagram showing the configuration of the arithmetic processing unit, in the signal arithmetic circuit 201, for producing the push-pull signal (tracking error signal). As shown in the drawing, the arithmetic processing unit of the push-pull signal is provided with adding circuits 21, 22, 24, and 25, subtracting circuits 23, 26, and 28, and a multiplying circuit 27.

It should be noted that in the above principle, the offset (DC component) contained in the push-pull signal (tracking error signal) is suppressed when k>0. The present embodiment, however, is so configured that according to the arithmetic circuit shown in FIG. 18, the offset (DC component) is suitably suppressed when k<0. That is, in the above principle, the signal PP2 shown in FIG. 12C is evaluated using PP2=(G+B)−(F+C). In the present embodiment, however, the signal PP2 is evaluated using PP2=(F+C)−(G+B) according to the arithmetic circuit shown in FIG. 18, and thus, the offset (DC component) is suitably suppressed when k<0.

The adding circuit 21 adds output signals from the sensors P11 and P12 and outputs a signal corresponding to a light amount of the signal light on the left side, out of the two left and right signal lights. The adding circuit 22 adds output signals from the sensors P17 and P18 and outputs a signal corresponding to a light amount of the signal light on the right side, out of the two left and right signal lights. The subtracting circuit 23 takes the difference between the output signals from the adding circuits 21 and 22, thereby producing the signal PP1 based on the light amount difference between the two left and right signal lights.

The adding circuit 24 adds output signals from the sensors P13 and P14 and outputs a signal corresponding to the light amount on the left side of the two upper and lower signal lights. The adding circuit 25 adds output signals from the sensors P15 and P16 and outputs a signal corresponding to the light amount on the right side of the two upper and lower signal lights. The subtracting circuit 26 takes the difference between the output signals from the adding circuits 24 and 25, thereby producing the signal PP2 based on the bias in the left and right directions of the two upper and lower signal lights.

The multiplying circuit 27 outputs a signal in which the variable k is multiplied by the signal PP2 outputted from the subtracting circuit 26, to the subtracting circuit 28. The subtracting circuit 28 subtracts the signal inputted from the multiplying circuit 27, from the signal PP1 inputted from the subtracting circuit 23, and outputs the signal that has been subtracted as the push-pull signal (tracking error signal).

The variable k in the multiplying circuit 27 is manually or automatically regulated to an optimal value. When regulated manually, for example, a volume regulating unit is provided to enable a change of the variable k by turning a screw. In this case, when shipping the manufactured goods, a test disc is used and while the push-pull signal (tracking error signal) is monitored, the value of the variable k is manually regulated to minimize the offset (DC component) of the push-pull signal (tracking error signal).

When the variable k is regulated automatically, a control process for increasing and decreasing the variable k by each Δk is added to the controller 204. In this case, when shipping the manufactured goods, a test disc is used to perform the regulating operation for the variable k. That is, the controller 204 changes the value of the variable k by each Δk before and after a default value, and at the same time, generates the lens shift (LS). Then, with respect to respective values of the variable k, the controller 204 acquires variable amounts of the offset value (DC component) of the push-pull signal when the lens shift is changed from 0 μm to 300 μm. The controller 204 sets the value of the variable k when the acquired variable amount is minimized, as the value of the variable k of the multiplying circuit 27 during actual operation.

It should be noted that the signal arithmetic circuit 201 shown in FIG. 16 may be optionally arranged either on the optical pickup apparatus side or on the optical disc apparatus side. Furthermore, one portion of the circuit portion configuring the signal arithmetic circuit 201 may be optionally arranged on the optical pickup apparatus side. For example, the entire arithmetic processing unit shown in FIG. 18 may be optionally arranged either on the optical pickup apparatus side or on the optical disc apparatus side. Alternatively, the arithmetic processing unit may be optionally divided and placed in the optical pickup apparatus and the optical disc apparatus. In this case, the circuit units for producing the signals PP1 and PP2 are arranged on the optical pickup apparatus side and the circuits after those circuit units are arranged on the optical disc apparatus side, for example.

Thus, according to the embodiment, from among recording layers disposed in the disc, the overlapping between the signal light reflected from the target recording layer, and the stray lights 1 and 2 reflected from the recording layers present above and below the target recording layer can be prevented from overlapping one another on the light-receiving surface (the surface S0 where the signal light spot becomes a circle of least confusion at the time of on-focus) of the photodetector 113. More specifically, the distribution of the signal light and the stray lights 1 and 2 on the light-receiving surface (surface S0) can be made as shown in FIG. 9B. Therefore, by placing the sensor pattern shown in FIG. 10D in the signal light region of FIG. 9B, only the corresponding signal light can be received by the sensors P11 to P18. Thus, the degradation of the detection signal due to the stray light can be effectively inhibited using a simple configuration. Furthermore, in the present embodiment, the signal light is guided respectively to the four different apical positions of a square, on the light receiving surface of the photodetector 113, as shown in FIG. 9B. This facilitates placement of the sensors P11 to P18 and makes compact the region where the sensors are placed, as shown in FIG. 10D.

In addition, according to the present embodiment, since the push-pull signal (tracking error signal) is produced by the circuit configuration of FIG. 18, effective suppression of the offset (DC component) contained in the push-pull signal (tracking error signal) is enabled, as described based on the above simulation results.

Moreover, it is possible to accomplish these effects only by placing the angle adjusting element 112 in the optical path of the laser light reflected by the disc, i.e., between the detection lens 111 and the photodetector 113 in the configuration in FIG. 16. Therefore, according to the present embodiment, it is possible to effectively eliminate the influence caused by the stray light using a simple configuration, and it is also possible to suppress the offset (DC component) contained in the push-pull signal (tracking error signal).

Figure 19:
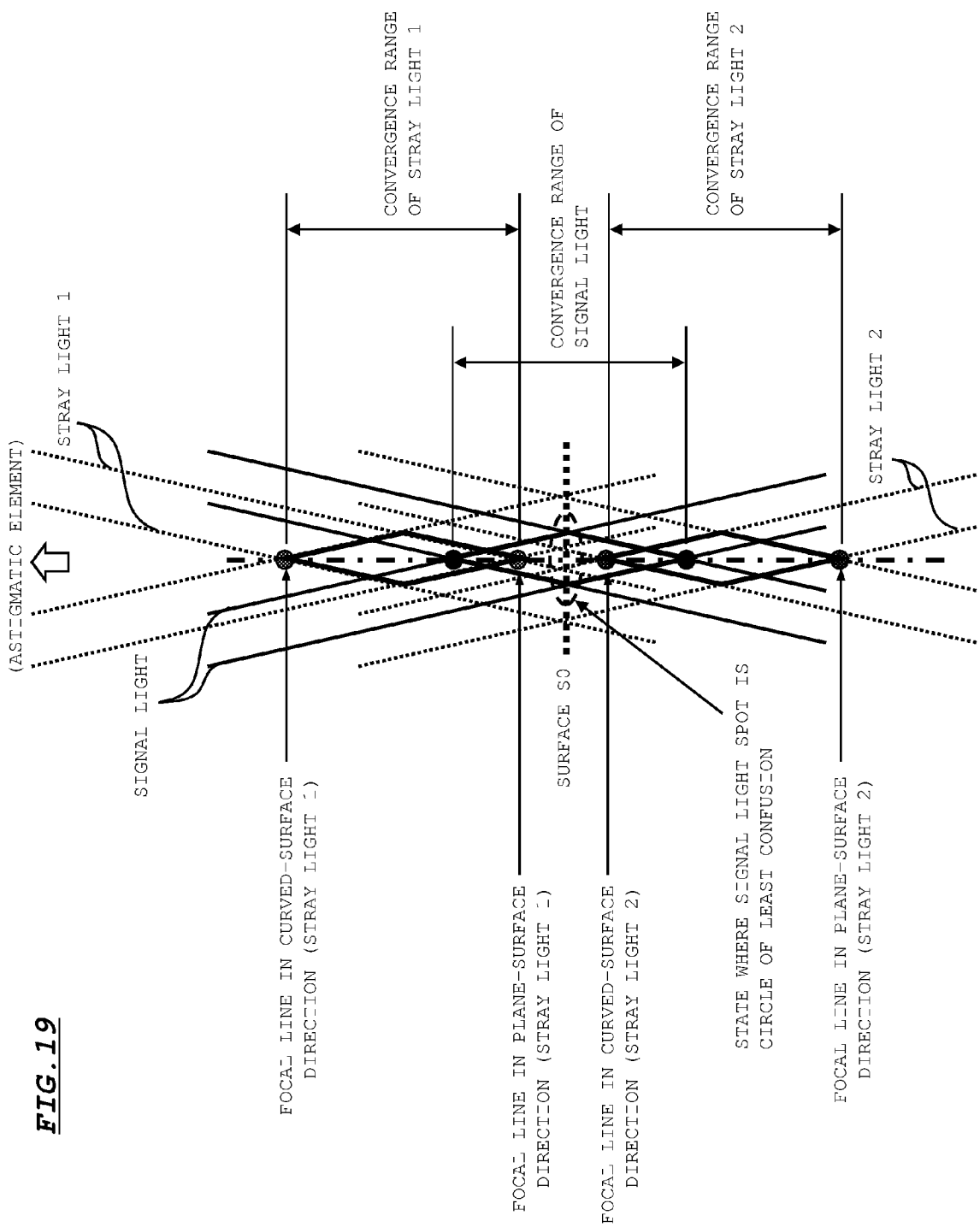
FIG. 19 is a diagram showing a preferred applicable range of technical principles of the embodiment and the present invention.

The stray light elimination effect realized by the above principle is exhibited, as shown in FIG. 19, when the focal line position of the stray light 1 in the plane-surface direction is positioned closer to the astigmatic element than the surface S0 (the surface on which the spot of the signal light is rendered a least circle of confusion) and when the focal line position of the stray light 2 in the curved-surface direction is positioned farther away from the astigmatic element than the surface S0. In other words, as long as this relationship is fulfilled, for example, even if the focal line position of the stray light 1 in the plane-surface direction is closer to the surface S0 than the focal line position of the signal light in the curved-surface direction, or else, even if the focal line position of the stray light 2 in the curved-surface direction is closer to the surface S0 than the focal line position of the signal light in the plane-surface direction, the effects of the present invention and the embodiment based on the aforementioned principle can be demonstrated.

MODIFIED EXAMPLE

In the above embodiment, the photodetector 113 has the sensor pattern shown in FIG. 10D. However, in substitution thereof, sensor patterns shown in FIGS. 20B and 20C may be optionally provided. In this manner, even when the angle adjusting element 112 deviates or when a tilt occurs in the disc, the reflected light from the disc is guided into the sensor region more surely.

Hereinafter, with reference to simulation results relating to the modified example, the sensor pattern used in the modified example will be described.

The simulation according to the modified example was performed using the optical system (FIG. 11) for the simulation performed according to the principle above. The simulation was performed under two conditions, i.e., the conditions (1) to (10) above (hereafter "reference conditions") and conditions to which predetermined parameters (described later) are added to those conditions (hereafter "additional conditions").

A light-colored region in FIG. 20A shows a distribution equal to or greater than a predetermined intensity of a signal light with which the sensor pattern on the photodetector 18 is irradiated under the reference conditions. As shown in the drawing, the distribution for a signal light equal to or greater than the predetermined intensity is stayed within in the sensors P11 to P18.

Subsequently, a simulation was performed under the additional conditions to which parameters shown in (11) to (14) below are added to the reference conditions.
(11) Deviation in a disc radial direction of the angle adjusting element 17: 15 μm;
(12) Tilt in a disc radial direction: 0.6 degrees;
(13) Tilt in a direction vertical to the disc radial direction (circumferential direction): 0.3 degrees; and
(14) Lens shift: 300 μm.

It should be noted that the values shown in (11) to (14) above express a maximum change amount of each parameter from the reference conditions. That is, under the additional conditions, each optical component is displaced within the range of the values shown in (11) to (14) above.

A dark-colored region in FIG. 20A shows a distribution equal to or greater than a predetermined intensity of a signal light with which the sensor pattern on the photodetector 18 is irradiated under the additional conditions. As shown in the drawing, the distribution of the signal light equal to or greater than the predetermined intensity protrudes outside of the sensors P11 to P18.

As can be seen from the simulation results above, when the conditions shown in (11) to (14) above are added to the reference conditions, the distribution of the signal light equal to or greater than the predetermined intensity spreads to outside of the sensors P11 to P18. In this case, the light amount of the signal light received by each sensor is decreased, and thus, the detection signal of the signal light outputted from each sensor is deteriorated as compared to a case of the reference conditions. Thus, the present inventors of the subject application investigated the provision of sensors corresponding to the regions 1 to 4 that may include a range in which the signal light equal to or greater than the predetermined intensity is distributed, under the additional conditions.

FIG. 20B shows a sensor pattern capable of receiving, also under the additional conditions, a signal light equal to or greater than the predetermined intensity. Sensors P21 to P28 are sensors having light receiving regions obtained by adding the regions 1 to 4 in FIG. 20A to the light receiving regions of the sensors P11 to P18. Thus, although the stray light shown in FIG. 9 comes within the light receiving regions of the sensors P21 to P28 outside the signal light region, even under the additional conditions, the signal light equal to or greater than the predetermined intensity is received by the sensors P21 to P28.

FIG. 20C is a diagram showing a sensor pattern in which the sensors P23 to P26 in FIG. 20B are replaced by the sensors P13 to P16. Doing so, although the sensors P13 to P16 are not able to receive the signal light protruding from the signal light region, since the sensors P13 to P16 do not protrude into outside the signal light regions, the stray light that comes within the sensors P13 to P16 is smaller than the stray light that comes within the sensors P23 to P26. As a result, when the sensor pattern in FIG. 20C is used, the accuracy of the detection signal of the sensor with respect to PP2 may be improved as compared to that in FIG. 20B. In this manner, the offset (DC component) contained in the pull-push signal (tracking error signal) may be suppressed appropriately.

As can be seen with reference to FIG. 20A, the distribution of the signal light protruding from the upper and lower sensors P13 to P16 is smaller than the distribution of the signal light protruding from the left and right sensors P11, P12, P17, and P18. As a result, even when using the sensors P13 to P16 in FIG. 20C as the upper and lower sensors under the additional conditions, the signal light may be sufficiently received by the sensors P13 to P16.

It should be noted that in FIG. 20C, although the left and right sensors are protruded from the signal light region, it may be optionally possible that the upper and lower sensors are protruded from the signal light region as shown in FIG. 20B and the left and right sensors are stayed within the signal light region. In this manner, it is possible to receive more signal light by the upper and lower sensors, and at the same time, it is possible to suppress the influence of the stray light on the left and right sensors.

Moreover, it is not necessary for the upper and lower sensors to be in a region covering the regions 2 and 3 shown in FIG. 20A. That is, a portion outside of the signal light region for the upper and lower sensors may be optionally smaller than a portion provided outside the signal light region for the sensors P23 to P26 in FIG. 20B. Doing so, the influence of the stray light incident upon the upper and lower sensors is more ameliorated than the situation shown in FIG. 20B, and the light amount of the signal light received by the upper and lower sensors is ameliorated than the situation in FIG. 20C.

The embodiment of the present invention is thus described above. However, the present invention is not limited thereto, and the embodiment of the present invention can also be modified in various ways apart from the aforementioned description.

Figure 21B:
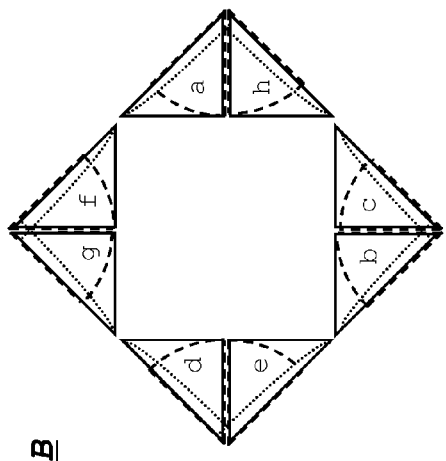
FIG. 21A to FIG. 21D are diagrams showing another modified example of the embodiment (diagrams for explaining a modified mode of the sensor pattern resulting from a modification of the optical system and a modification of an arithmetic expression resulting from a modification in direction of a track image).

It should be noted that the embodiment and the modified example include the configuration for eliminating the stray light in addition to the configuration for suppressing the DC component. However, when there is no necessity to eliminate the stray light, the angle adjusting element 112 is deleted from the configuration in FIG. 16 and the sensor pattern for the photodetector 113 is changed from the pattern shown in FIG. 21B to the pattern shown in FIG. 21A, thereby enabling suppression of the offset (DC component) contained in the push-pull signal (tracking error signal). In the sensor pattern shown in FIG. 21A, the four sensors shown in FIG. 10B are divided into two portions in respective beam circumferential directions.

In this case, with respect to outputs A to H of each sensor for receiving light from luminous flux regions a to h, similarly to the above embodiment, the signals PP1 and PP2 are evaluated by an arithmetic operation of PP1=(A+H)−(D+E) and PP2=(F+C)−(G+B), and the arithmetic operation according to the expression (1) is performed on the evaluated signals PP1 and PP2. Thereby, it becomes possible to suppress the offset (DC component) contained in the push-pull signal (tracking error signal). It should be noted that in this case, the focus error signal, as described with reference to FIG. 10B, is evaluated using the arithmetic operation of FE=(A+B+E+F)−(C+D+G+H).

Figure 21D:
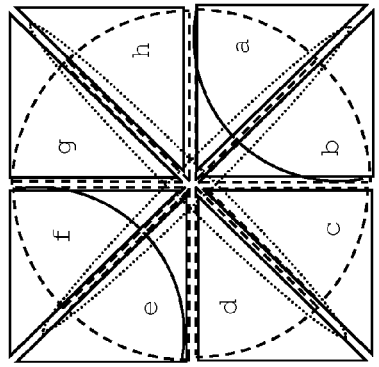
Figure 21A:
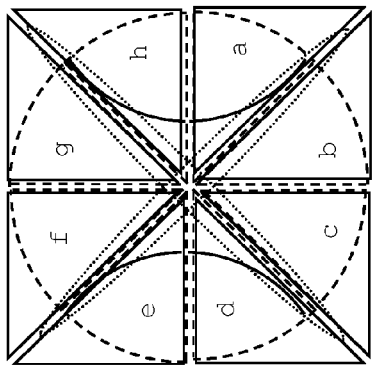
Figure 21C:
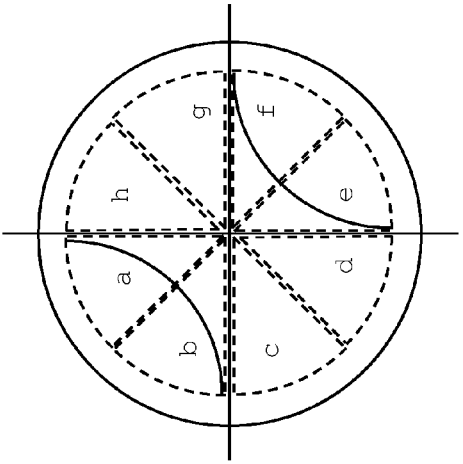

In that case, it is described that the track image from the disc is inclined at an angle of 45 degrees with respect to a direction of generation (plane-surface direction/curved-surface direction) of the astigmatism. However, as shown in FIG. 21C, it is possible to adjust the optical system so that the track image is parallel to the direction of generation of the astigmatism. In this case, the track image is positioned as shown in FIG. 21D with respect to each luminous flux region on the light receiving surface of the photodetector. In FIG. 21D, the track image is shown by a solid line and the shape of the beam during off-focus is shown by a dotted line.

In this case, with respect to outputs A to H of each sensor for receiving light from luminous flux regions a to h, the signals PP1 and PP2 are evaluated by an arithmetic operation of PP1=(A+B)−(E+F) and PP2=(G+D)−(H+C), and the arithmetic operation according to the expression (1) is performed on the evaluated signals PP1 and PP2. Thereby, it becomes possible to suppress the offset (DC component) contained in the push-pull signal (tracking error signal). Also in this case, the focus error signal is evaluated by the arithmetic operation of FE=(A+B+E+F)−(C+D+G+H), similarly to the above-described case.

FIG. 21D shows a sensor pattern when the angle adjusting element 112 is not disposed. However, also in a case where the four luminous flux regions are dispersed by disposing the angle adjusting elements 112 as shown above and each signal light is received by the sensor pattern in FIG. 21B, similarly, the signals PP1 and PP2 are evaluated by an arithmetic operation of PP1=(A+B)−(E+F) and PP2=(G+D)−(H+C), and the arithmetic operation according to the expression (1) is performed on the evaluated signals PP1 and PP2. Thereby, it becomes possible to suppress the offset (DC component) contained in the push-pull signal (tracking error signal).

Besides, the embodiment of the present invention may be modified in various ways, where appropriate, within the range of the technological idea set forth in the claims.

In the drawings, FIG. 12B, the boxes around "P" and "P/2" should be removed:
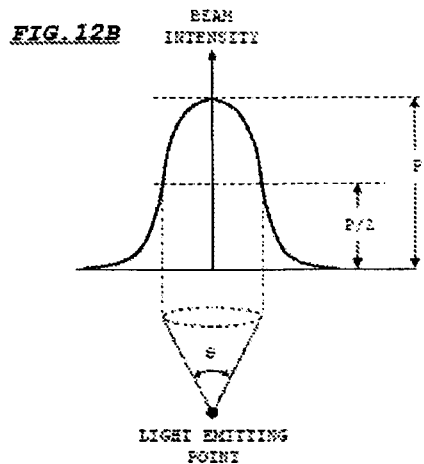
In the drawings, FIG. 12D, the extraneous circles should be removed:
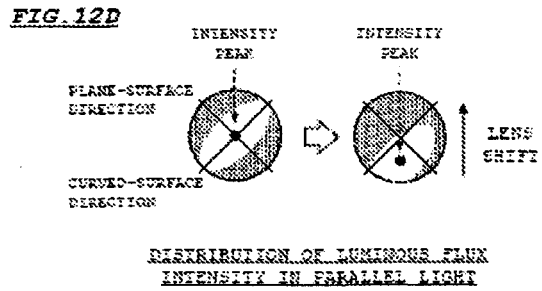
In the drawings, FIGS. 15A and 15B, the box extending between FIGS. 15A and 15B should be removed:
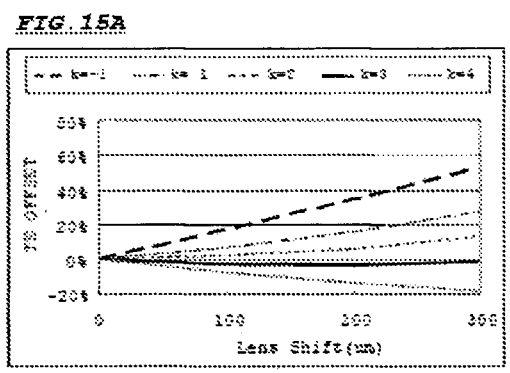
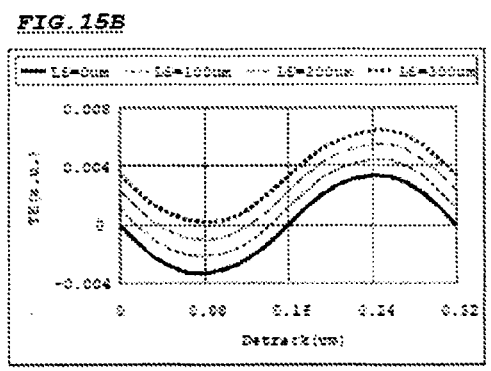

What is claimed is:

1. An optical pickup apparatus, comprising:
    a laser light source;
    an objective lens for converging a laser light emitted from the laser light source onto a recording medium;
    an astigmatic element for introducing an astigmatism into the laser light reflected by the recording medium so as to mutually space a first focal line position occurring by convergence of the laser light in a first direction and a second focal line position occurring by convergence of the laser light in a second direction vertical to the first direction, in a propagation direction of the laser light; and
    a photodetector having eight sensors for individually receiving eight luminous fluxes, the eight luminous being obtained by dividing a luminous flux of the laser light reflected by the recording medium into eight portions by first and second straight lines respectively parallel to the first and second directions and third and fourth straight lines each having an angle of 45 degrees relative to the first and second straight lines, wherein
    the astigmatic element is placed so that a track image from the recording medium is parallel to any of the first, second, third, and fourth straight lines.

2. The optical pickup apparatus according to claim 1, further comprising
    an optical element for mutually differentiating the propagation directions of first, second, third and fourth luminous fluxes obtained by dividing the luminous flux of the laser light reflected by the recording medium into four portions by the first and second straight lines so that these first, second, third and fourth luminous fluxes are dispersed to one another.

3. The optical pickup apparatus according to claim 2, wherein
    the optical element changes the propagation directions of the first, second, third and fourth luminous fluxes so that the first, second, third and fourth luminous fluxes are respectively guided to four different apical positions forming a rectangle on a light receiving surface of the photodetector.

4. The optical pickup apparatus according to claim 1, further comprising an arithmetic circuit for processing an output from the photodetector, wherein
    when the luminous flux of the laser light reflected from the recording medium is divided into fifth, sixth, seventh and eighth luminous fluxes by the two straight lines, out of the first, second, third, and fourth straight lines, having an angle of 45 degrees with respect to the track image, the fifth and sixth luminous fluxes are aligned in a direction transverse the track image, and the seventh and eighth luminous fluxes are aligned in a direction parallel to the track image,
    the arithmetic circuit includes:
        a first arithmetic unit for calculating a light amount difference between the fifth and sixth luminous fluxes based on output signals from the sensors corresponding to the fifth and sixth luminous fluxes; and
        a second arithmetic unit for calculating a bias of the light amount of the seventh and eighth luminous fluxes in the direction transverse the track image based on output signals from the sensors corresponding to the seventh and eighth luminous fluxes.

5. The optical pickup apparatus according to claim 4, wherein
    the arithmetic circuit is further provided with a third arithmetic unit for subtracting a value obtained by multiplying a variable k by an arithmetic value by the second arithmetic unit, from an arithmetic value by the first arithmetic unit, and
    the variable k takes a positive value when the arithmetic value by the first arithmetic unit and the arithmetic value by the second arithmetic unit displace in the same direction depending on offset of the objective lens with respect to the optical axis of the laser light, and
    the variable k takes a negative value when the arithmetic value by the first arithmetic unit and the arithmetic value by the second arithmetic unit displace in different directions.

6. The optical pickup apparatus according to claim 5, wherein
    the variable k is set to a value that permits optimal suppression of a DC component occurring in the arithmetic value by the first arithmetic unit resulting from the offset.

7. The optical pickup apparatus according to claim 3, wherein
    the sensor placed on a pair of apical angles facing at least one diagonal direction, out of the four apical angles, has a shape protruding from the rectangle towards the diagonal direction.

8. An optical disc apparatus, comprising:
an optical pickup apparatus; and
an arithmetic circuit, wherein
the optical pickup apparatus comprises:
- a laser light source;
- an objective lens for converging a laser light emitted from the laser light source onto a recording medium;
- an astigmatic element for introducing an astigmatism into the laser light reflected by the recording medium so as to mutually space a first focal line position occurring by convergence of the laser light in a first direction and a second focal line position occurring by convergence of the laser light in a second direction vertical to the first direction, in a propagation direction of the laser light; and
- a photodetector having eight sensors for individually receiving eight luminous fluxes, the eight luminous being obtained by dividing a luminous flux of the laser light reflected by the recording medium into eight portions by first and second straight lines respectively parallel to the first and second directions and third and fourth straight lines each having an angle of 45 degrees relative to the first and second straight lines; and the astigmatic element is placed so that a track image from the recording medium is parallel to any of the first, second, third, and fourth straight lines, and
when the luminous flux of the laser light reflected from the recording medium is divided into fifth, sixth, seventh and eighth luminous fluxes by the two straight lines, out of the first, second, third, and fourth straight lines, having an angle of 45 degrees with respect to the track image, the fifth and sixth luminous fluxes are aligned in a direction transverse the track image, and the seventh and eighth luminous fluxes are aligned in a direction parallel to the track image,
the arithmetic circuit includes:
- a first arithmetic unit for calculating a light amount difference between the fifth and sixth luminous fluxes based on output signals from the sensors corresponding to the fifth and sixth luminous fluxes;
- a second arithmetic unit for calculating a bias of the light amount of the seventh and eighth luminous fluxes in the direction transverse the track image based on output signals from the sensors corresponding to the seventh and eighth luminous fluxes; and
- a third arithmetic unit for subtracting a value obtained by multiplying a variable k by an arithmetic value by the second arithmetic unit, from an arithmetic value by the first arithmetic unit, and the variable k takes a positive value when the arithmetic value by the first arithmetic unit and the arithmetic value by the second arithmetic unit displace in the same direction depending on offset of the objective lens with respect to the optical axis of the laser light, and
the variable k takes a negative value when the arithmetic value by the first arithmetic unit and the arithmetic value by the second arithmetic unit displace in different directions.

9. The optical disc apparatus according to claim 8, wherein the variable k is set to a value that permits optimal suppression of a DC component occurring in the arithmetic value by the first arithmetic unit resulting from the offset.

* * * * *

UNITED STATES PATENT AND TRADEMARK OFFICE
CERTIFICATE OF CORRECTION

Page 1 of 2

PATENT NO. : 8,121,013 B2
APPLICATION NO. : 12/567299
DATED : February 21, 2012
INVENTOR(S) : Kenji Nagatomi and Yoichi Tsuchiya It is certified that error appears in the above-identified patent and that said Letters Patent is hereby corrected as shown below:

In the drawings, FIG. 11, the boxes on upper and lower ends of the "DISC" should be removed:

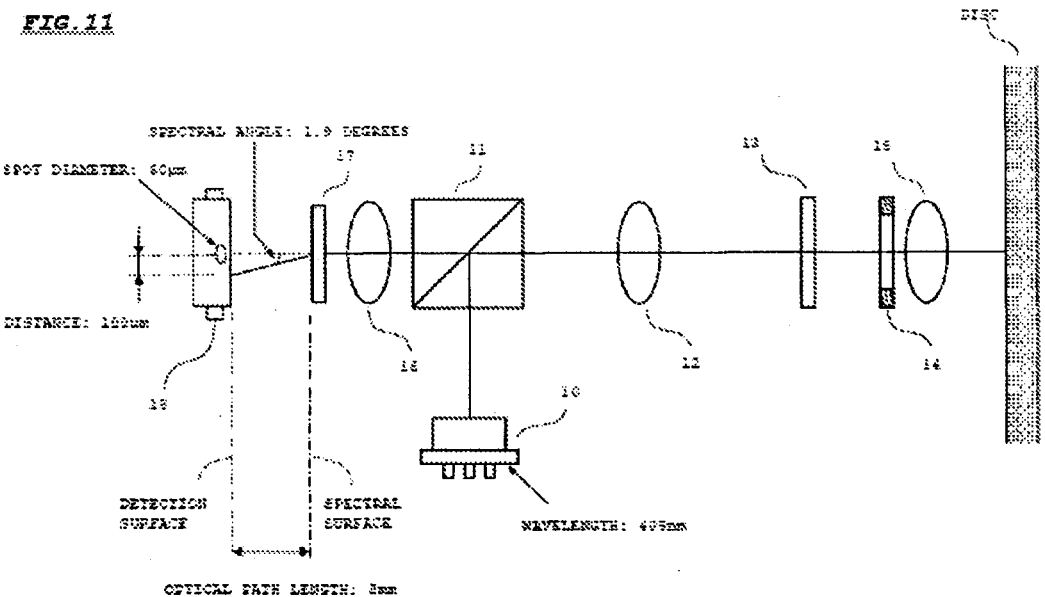

Signed and Sealed this
Twenty-fourth Day of July, 2012

David J. Kappos
*Director of the United States Patent and Trademark Office*